US 11,796,560 B2

(12) United States Patent
Liukku et al.

(10) Patent No.: US 11,796,560 B2
(45) Date of Patent: Oct. 24, 2023

(54) MEMS ACCELEROMETER WITH MECHANICALLY DECOUPLED PROOF MASS

(71) Applicant: MURATA MANUFACTURING CO., LTD., Nagaokakyo (JP)

(72) Inventors: Matti Liukku, Helsinki (FI); Anssi Blomqvist, Helsinki (FI); Hannu Vesterinen, Espoo (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/202,736

(22) Filed: Mar. 16, 2021

(65) Prior Publication Data
US 2021/0293847 A1    Sep. 23, 2021

(30) Foreign Application Priority Data

Mar. 18, 2020   (FI) ..................................... 20205272

(51) Int. Cl.
*G01P 15/125*    (2006.01)
*G01P 15/18*    (2013.01)
(Continued)

(52) U.S. Cl.
CPC .............. *G01P 15/125* (2013.01); *G01P 1/00* (2013.01); *G01P 15/18* (2013.01); *G01P 2015/0871* (2013.01)

(58) Field of Classification Search
CPC ..... G01P 2015/0805; G01P 2015/0808; G01P 2015/082; G01P 2015/0854; G01P 15/125
See application file for complete search history.

(56) References Cited

U.S. PATENT DOCUMENTS 5,817,942 A * 10/1998 Greiff .................. G01P 15/125
73/514.01
6,065,341 A * 5/2000 Ishio ..................... B81B 3/0051
361/283.3

(Continued)

FOREIGN PATENT DOCUMENTS

DE    102009000729 A1    8/2010
DE    102012104601 A1 * 12/2012 ............ G01P 15/125

OTHER PUBLICATIONS

European Search Report dated Aug. 2, 2021 corresponding to European Patent Application No. 21161170.
(Continued)

*Primary Examiner* — Jill E Culler
*Assistant Examiner* — Ruben C Parco, Jr.
(74) *Attorney, Agent, or Firm* — SQUIRE PATTON BOGGS (US) LLP

(57) ABSTRACT

The present invention relates to MEMS (microelectromechanical systems) accelerometers, in particular to an accelerometer designed to reduce error in the accelerometer output. The MEMS accelerometer includes a proof mass, which is capable of movement along at least two perpendicular axes and at least one measurement structure. The proof mass is mechanically coupled to the measurement structure along the sense axis of the measurement structure, such that movement of the proof mass along the sense axis causes the moveable portion of the measurement structure to move, and is decoupled from the measurement structures along an axis or axes perpendicular to the sense axis of the measurement structure, such that movement of the proof mass perpendicular to the sense axis of the measurement structure does not cause the moveable portion of the measurement structure to move.

11 Claims, 5 Drawing Sheets

(51) Int. Cl.
*G01P 1/00* (2006.01)
*G01P 15/08* (2006.01)

(56) References Cited

U.S. PATENT DOCUMENTS

| | | | |
|---|---|---|---|
| 6,722,198 B1 * | 4/2004 | Konaka | G01C 19/56 73/504.03 |
| 8,459,114 B2 * | 6/2013 | Hsu | G01P 15/125 73/514.32 |
| 2009/0139330 A1 | 6/2009 | Pavelescu et al. | |
| 2010/0037691 A1 * | 2/2010 | Jeong | G01P 15/125 73/504.12 |
| 2010/0122579 A1 | 5/2010 | Hsu et al. | |
| 2013/0192364 A1 | 8/2013 | Acar | |
| 2017/0089946 A1 | 3/2017 | Liukku et al. | |
| 2017/0184628 A1 | 6/2017 | Hsu et al. | |
| 2017/0192033 A1 | 7/2017 | Yoshida et al. | |

OTHER PUBLICATIONS

Finnish Search Report dated Nov. 16, 2020 corresponding to Finnish Patent Application No. 20205272.

\* cited by examiner

MEMS ACCELEROMETER WITH MECHANICALLY DECOUPLED PROOF MASS

FIELD OF THE INVENTION

The present invention relates to MEMS (microelectromechanical systems) accelerometers, in particular to an accelerometer designed to reduce error in the accelerometer output.

BACKGROUND

When used to support autonomous driving, MEMS accelerometers must be highly accurate and have low noise in their outputs. High accuracy accelerometers, such as those used in electronic stability control systems, generally require independence of each of the sense axes—i.e. an individual proof mass for each sense axis—in order to reduce inaccuracies that result from cross-axis interference. However, the use of individual proof masses for the sense axes reduces the maximum size of each individual proof mass since MEMS systems are generally subject to significant size constraints. As a result of the smaller proof masses, the accelerometer is more susceptible to noise. Other MEMS accelerometers, such as those used in smartphones, often use a single proof mass for multiple axes in order to keep the complexity of the system (and therefore cost) down. While this enables a larger proof mass to be used, these accelerometers are highly susceptible to cross-axis error and parasitic modes of movement of the proof mass, which significantly reduce the accuracy of these accelerometers.

SUMMARY OF THE INVENTION

The present invention provides a MEMS accelerometer that includes a proof mass, which is capable of movement along at least two perpendicular axes, and at least one measurement structure. The proof mass is mechanically coupled to the measurement structure along the sense axis of the measurement structure, such that movement of the proof mass along the sense axis causes the moveable portion of the measurement structure to move. However, the proof mass is decoupled from the measurement structures along an axis or axes perpendicular to the sense axis of the measurement structure, such that movement of the proof mass perpendicular to the sense axis of the measurement structure does not cause the moveable portion of the measurement structure to move. As such, cross axis error caused by parasitic movement of the moveable measurement structures perpendicular the sense axis is reduced. In a multi-axis accelerometer, this further enables a large proof mass to be used for both axes without introducing cross-axis error, which in turn improves thermal noise performance of the accelerometer.

According to a first aspect of the invention, a MEMS accelerometer is provided. The accelerometer comprises:
  a substrate, which defines a substrate plane;
  at least one in-plane proof mass that is configured to move relative to the substrate along at least a first axis and a second axis, wherein the first axis and second axis are parallel to the substrate plane and perpendicular to each other; and
  a first measurement structure for measuring movement of the proof mass along a first measurement axis parallel to the first axis, the first measurement structure comprising a first moveable measurement structure, which is moveable relative to the substrate.

The accelerometer is configure such that the at least one in-plane proof mass is connected to the first moveable measurement structure by at least one spring that mechanically couples the motion of the proof mass and first moveable measurement structure along the first axis and mechanically decouples movement of the proof mass and the first moveable measurement structure along the second axis.

The first moveable measurement structure may be connected to a first fixed support structure by at least one spring which mechanically couples the motion of the first moveable measurement structure and the first fixed support structure along the second axis and mechanically decouples movement of the first moveable measurement structure and the first fixed support structure along the first axis.

The first measurement structure may also comprise a first fixed measurement structure, which is fixed relative the substrate.

The first moveable measurement structure may comprise at least one first moveable electrode and the first fixed measurement structure comprises at least one first fixed electrode.

The first measurement structure may be configured to measure the change in capacitance between the first fixed comb electrode and first moveable comb electrode caused by movement of the at least one in-plane proof mass parallel to the first axis.

The at least one first moveable electrode and at least one first fixed electrode may be comb electrodes, wherein the comb electrodes form a comb capacitor.

The accelerometer may further comprise a second measurement structure for measuring movement of the proof mass along a second measurement axis parallel to the second axis, the second measurement structure comprising a second moveable measurement structure, which is moveable relative to the substrate. The at least one in-plane proof mass is connected to the second moveable measurement structure by at least one spring that mechanically couples the motion of the proof mass and second moveable measurement structure along the second axis and mechanically decouples movement of the proof mass and the second moveable measurement structure along the first axis.

The second measurement structure may also comprise a second fixed measurement structure, which is fixed relative the substrate.

The second moveable measurement structure may comprise at least one second moveable electrode and the second fixed measurement structure comprises at least one second fixed electrode.

The second measurement structure may be configured to measure the change in capacitance between the second fixed comb electrode and second moveable comb electrode caused by movement of the at least one in-plane proof mass parallel to the second axis.

The at least one second moveable electrode and at least one second fixed electrode may be comb electrodes, wherein the comb electrodes form a comb capacitor.

The springs may be beam springs, each of which resists compression along its longitudinal axis and permits bending of the spring along a transverse axis parallel to the substrate plane.

Each beam spring may also resist bending of the spring along a transverse axis perpendicular to the substrate plane.

The MEMS accelerometer may further comprise one or more stoppers, which may be fixed to the substrate or a cap wafer, and which restrict movement of the moveable measurement structures in at least one direction perpendicular to the measurement axis of the measurement structure.

The MEMS accelerometer may further comprise a third measurement structure, for measuring movement of the proof mass along the first measurement axis parallel to the first axis, the third measurement structure comprising a third moveable measurement structure, which is moveable relative to the substrate, and a third fixed measurement structure, which is fixed relative to the substrate, wherein the third measurement structure is positioned on the opposite side of the MEMS accelerometer to the first measurement structure, and wherein the arrangement of the third moveable measurement structure and third fixed measurement structure is a reflection of the arrangement of the first moveable measurement structure and first fixed measurement structure about a central axis of reflection parallel to the second axis and located between the moveable and fixed measurement structures.

The first moveable measurement structure and third moveable measurement structure may be connected by a central beam to form a unitary moveable measurement structure. Each of the first and third moveable measurement structures may be a longitudinal beam, and the central beam may be a transverse beam extending from the centre of each longitudinal beam, wherein the longitudinal beams are arranged parallel to the first axis and the transverse beam is arrange parallel to the second axis.

The first fixed measurement structure may comprises two first fixed measurement structures and wherein the third fixed measurement structure comprises two third fixed measurement structures, wherein the first fixed measurement structures and third fixed measurement structures are located between the longitudinal beams and such that one of the first fixed measurement structures and one of the first third fixed measurement structures are located on each side of the central beam.

The unitary moveable measurement structure may be connected to the at least one in-plane proof mass by four springs, wherein each of the four springs is located at one of the ends of the longitudinal beams.

The unitary moveable measurement structure may be connected to the fixed support structures by four springs, wherein each of the four springs is located at one of the ends of the longitudinal beams.

Each of the first and third moveable measurement structures may be a longitudinal beam, and the first fixed measurement structure and third fixed measurement structure may be located between the first moveable measurement structure and the third moveable measurement structure.

The first moveable measurement structure may be connected to the at least one in-plane proof mass by two springs, wherein each of the two springs is connected to the first moveable measurement structure at the centre of the first moveable measurement structure, or within the middle 25% of the first moveable measurement structure, and wherein the third moveable measurement structure is connected to the at least one in-plane proof mass by two springs, wherein each of the two springs is connected to the third moveable measurement structure at the centre of the third moveable measurement structure, or within the middle 25% of the third moveable measurement structure.

The first moveable measurement structure may be connected to the first fixed support structure by two springs, wherein each of the two springs is located at one of the ends of the first moveable measurement structure, and wherein the third moveable measurement structure is connected to the third fixed support structure by two springs, wherein each of the two springs is located at one of the ends of the third moveable measurement structure.

The first and third fixed support structures may be connected to a common anchor point at the centre of the accelerometer.

The first and third fixed measurement structures may be connected to the common anchor point at the centre of the accelerometer.

The MEMS accelerometer may further comprise a fourth measurement structure, for measuring movement of the proof mass along the second measurement axis parallel to the second axis, the fourth measurement structure comprising a fourth moveable measurement structure, which is moveable relative to the substrate, and a fourth fixed measurement structure, which is fixed relative to the substrate, wherein the fourth measurement structure is positioned on the opposite side of the MEMS accelerometer to the second measurement structure, and wherein the arrangement of the fourth moveable measurement structure and fourth fixed measurement structure is a reflection of the arrangement of the second moveable measurement structure and second fixed measurement structure about a central axis of reflection parallel to the first axis and located between the moveable and fixed measurement structures.

Each of the second and fourth moveable measurement structures may be a longitudinal beam, and the second fixed measurement structure and fourth fixed measurement structure ay be located between the second moveable measurement structure and the fourth moveable measurement structure.

The second moveable measurement structure may be connected to the at least one in-plane proof mass by two springs, wherein each of the two springs is connected to the first moveable measurement structure at the centre of the first moveable measurement structure, or within the middle 25% of the first moveable measurement structure, and wherein the fourth moveable measurement structure is connected to the at least one in-plane proof mass by two springs, wherein each of the two springs is connected to the third moveable measurement structure at the centre of the third moveable measurement structure, or within the middle 25% of the third moveable measurement structure.

The second moveable measurement structure may be connected to the first fixed support structure by two springs, wherein each of the two springs is located at one of the ends of the second moveable measurement structure, and wherein the fourth moveable measurement structure is connected to the third fixed support structure by two springs, wherein each of the two springs is located at one of the ends of the fourth moveable measurement structure.

The second and fourth measurement structures may be located on opposite sides of the accelerometer, such that the first and third measurement structure are located between the second and fourth measurement structures.

The at least one in-plane proof mass may have a generally rectangular outer perimeter and a hollow centre, and wherein the measurement structures, fixed support structures and springs are located within the hollow centre of the at least one in-plane proof mass.

The accelerometer may further comprise at least two out-of-plane proof masses, wherein the out-of-plane proof masses are configured to rotate out of parallel to the substrate plane, and wherein the combined centre of mass of the at least two proof masses is at the centre of the accelerometer.

The accelerometer may further comprise out-of-plane sense circuitry configured to sense rotation of the at least two out-of-plane proof masses out of parallel to the substrate plane.

The out-of-plane sense circuitry may comprise one or more moveable electrodes located on each out-of-plane proof mass and stationary electrodes that are in a fixed position relative to the substrate, wherein the moveable electrode and the stationary electrode form a capacitor, the capacitance of which changes as the out-of-plane proof mass rotates about its rotation axis.

The centre of mass of each out-of-plane proof mass may be offset from its axis of rotation such that:
  external acceleration in the out-of-plane axis acts upon the asymmetric mass of each proof mass to cause rotation of the proof mass about the axis of rotation; and
  external acceleration in a first axis parallel to the substrate plane acts upon the asymmetric mass and symmetric mass of both proof masses to cause movement of the proof masses parallel to the substrate plane.

The at least two out-of-plane proof masses may be rotatably connected to the at least one in-plane proof mass such that movement of the at least two out-of-plane proof masses parallel to the substrate plane causes movement of the at least one in-plane proof mass parallel to the substrate plane.

The at least two out-of-plane proof masses may be connected to the at least one in-plane proof mass via torsion springs, wherein the torsion springs allow rotation of the at least two out-of-plane proof masses out of parallel to the substrate plane and resist movement of the at least two proof masses parallel to the substrate plane relative to the at least one in-plane proof mass.

The at least two out-of-plane proof masses may be located towards the exterior of the MEMS accelerometer relative to the at least one in-plane proof mass.

The out-of-plane plane proof masses may comprise two C-shaped seesaw proof masses which extend around the exterior of the at least one in-plane mass, such that the two C-shaped out-of-plane proof masses are arranged as mirror-images and the proof masses is configured to rotate in opposite directions in response to an external acceleration in the out-of-plane axis.

The two C-shaped out-of-plane proof masses may be coupled by at least two springs, wherein at least one spring is disposed at each end of the C shape, such that the springs allow rotation of the two C-shaped out-of-plane proof masses in opposite directions but resist rotation of the two C-shaped out-of-plane proof masses in the same direction.

The second sense circuitry may comprises eight electrodes disposed on the see-saw proof masses and eight electrodes disposed above or below the see-saw proof masses forming eight gap detection capacitors, each capacitor being formed from one of the see-saw proof mass electrodes and one of the electrodes disposed above or below the see-saw proof masses, wherein:
  four electrodes are located on each proof mass;
  on each proof mass, a first pair of electrodes is located at a first end of the C-shape of the see-saw proof mass and a second pair of electrodes is located at a second end of the C-shape of the see-saw proof mass; and
  within each pair of electrodes, a first electrode is located towards the middle of the C-shape of the see-saw proof mass from the rotation axis of the see-saw proof mass and a second electrode is located towards the end of the C-shape of the see-saw proof mass from the rotation axis of the see-saw proof mass.

Acceleration of the accelerometer in the Z direction may be measured from the changes in capacitance of the gap detection capacitors using a double differential measurement.

The first moveable measurement structure may comprise two comb electrodes, wherein each comb electrode extends in opposite directions away from the first moveable measurement structure and such that the fingers of the comb electrodes extend parallel to the second axis.

The first moveable measurement structure may comprises a transverse beam, which extends parallel to the second axis, and two longitudinal beams, which are joined to an extend away from the transverse beam parallel to the first axis, such that there is a gap between the two longitudinal beams which extends along the first axis.

The spring connecting the at least one in-plane proof mass to the first moveable measurement structure may be connected to the transverse beam of the moveable measurement structure and is located within the gap between the longitudinal beams.

One of the comb electrodes may be connected to and extends away from each longitudinal beam.

The accelerometer may further comprise two first fixed measurement structures, wherein the fixed measurement structures comprise beams whose longitudinal axes extend away from the centre of the accelerometer perpendicular to one another and parallel to the substrate plane.

Each first fixed measurement structure may extend away from the centre of the accelerometer at a 45-degree angle to the first axis.

The first moveable measurement structure may be at least partially located between the first fixed measurement structures.

The fixed measurement structures may further comprise comb electrodes extending from the fixed measurement structures towards the first moveable measurement structure to form two comb capacitors.

The second moveable measurement structure may comprise two comb electrodes, wherein each comb electrode extends in opposite directions away from the second moveable measurement structure, and such that the fingers of the comb electrodes extend parallel to the first axis.

The second moveable measurement structure may comprise a transverse beam, which extends parallel to the first axis, and two longitudinal beams, which are joined to an extend away from the transverse beam parallel to the second axis, such that there is a gap between the two longitudinal beams which extends along the second axis.

The spring connecting the at least one in-plane proof mass to the second moveable measurement structure may be connected to the transverse beam of the moveable measurement structure and is located within the gap between the longitudinal beams.

One of the comb electrodes may be connected to and may extend away from each longitudinal beam.

The accelerometer may further comprise two second fixed measurement structures, wherein the second fixed measurement structures comprise beams whose longitudinal axes extend away from the centre of the accelerometer perpendicular to one another and parallel to the substrate plane.

Each second fixed measurement structure may extend away from the centre of the accelerometer at a 45-degree angle to the second axis.

The second moveable measurement structure may be at least partially located between the second fixed measurement structures.

The second fixed measurement structures may further comprise comb electrodes extending from the second fixed measurement structures towards the first moveable measurement structure to form two comb capacitors.

The MEMS accelerometer may further comprise a third measurement structure, for measuring movement of the proof mass along the first measurement axis parallel to the first axis, the third measurement structure comprising a third moveable measurement structure, which is moveable relative to the substrate, and two third fixed measurement structures, which are fixed relative to the substrate, wherein the third measurement structure is positioned on the opposite side of the MEMS accelerometer to the first measurement structure, and wherein the arrangement of the third moveable measurement structure and third fixed measurement structures is a reflection of the arrangement of the first moveable measurement structure and first fixed measurement structure about a central axis of the MEMS accelerometer.

The MEMS accelerometer may further comprises a fourth measurement structure, for measuring movement of the proof mass along the second measurement axis parallel to the second axis, the fourth measurement structure comprising a fourth moveable measurement structure, which is moveable relative to the substrate, and two fourth fixed measurement structures, which are fixed relative to the substrate, wherein the fourth measurement structure is positioned on the opposite side of the MEMS accelerometer to the second measurement structure, and wherein the arrangement of the fourth moveable measurement structure and fourth fixed measurement structures is a reflection of the arrangement of the second moveable measurement structure and second fixed measurement structure about a central axis of the MEMS accelerometer.

The transverse beams of the first, second, third and fourth moveable measurement structures may be arranged such that the outer edges of the transverse beams form part of the perimeter of a square.

The at least one in-plane proof mass may be located at the centre of the accelerometer when the accelerometer is at rest.

The first moveable measurement structure may be connected by at least one spring to a first fixed support structure and by at least one spring to a second fixed support structure.

The second moveable measurement structure may be connected by at least one spring to the first fixed support structure and by at least one spring to a third fixed support structure.

The third moveable measurement structure may be connected by at least one spring to the third fixed support structure and by at least one spring to a fourth fixed support structure.

The fourth moveable measurement structure may be connected by at least one spring to the fourth fixed support structure and by at least one spring to the second fixed support structure.

The first, second, third and fourth fixed support structures may be anchored to the substrate at first, second, third and fourth anchor points respectively, and the fixed support structures may extend away from the anchor points towards the exterior of the accelerometer at 45-degree angle to the first axis and at a 45-degree angle to the second axis.

The first fixed support structure may be located between one of the first fixed measurement structures and one of the second fixed measurement structures and may extend parallel to the adjacent first and second fixed measurement structures.

The second fixed support structure may be located between one of the first fixed measurement structures and one of the fourth fixed measurement structures and may extend parallel to the adjacent first and fourth fixed measurement structures.

The third fixed support structure may be located between one of the second fixed measurement structures and one of the third fixed measurement structures and may extend parallel to the adjacent second and third fixed measurement structure.

The fourth fixed support structure may be located between one of the third fixed measurement structures and one of the fourth fixed measurement structures and may extend parallel to the adjacent third and fourth fixed measurement structures.

A first spring may extend from each fixed support structure along a longitudinal axis of the fixed support structure to a corner of the accelerometer, where is it connected second and third springs which extend away from the first spring at 45-degree angles to the first spring and 90-degree angle to each other, and wherein the second and third springs are connected to the adjacent moveable measurement structures.

DETAILED DESCRIPTION

Figure 1:
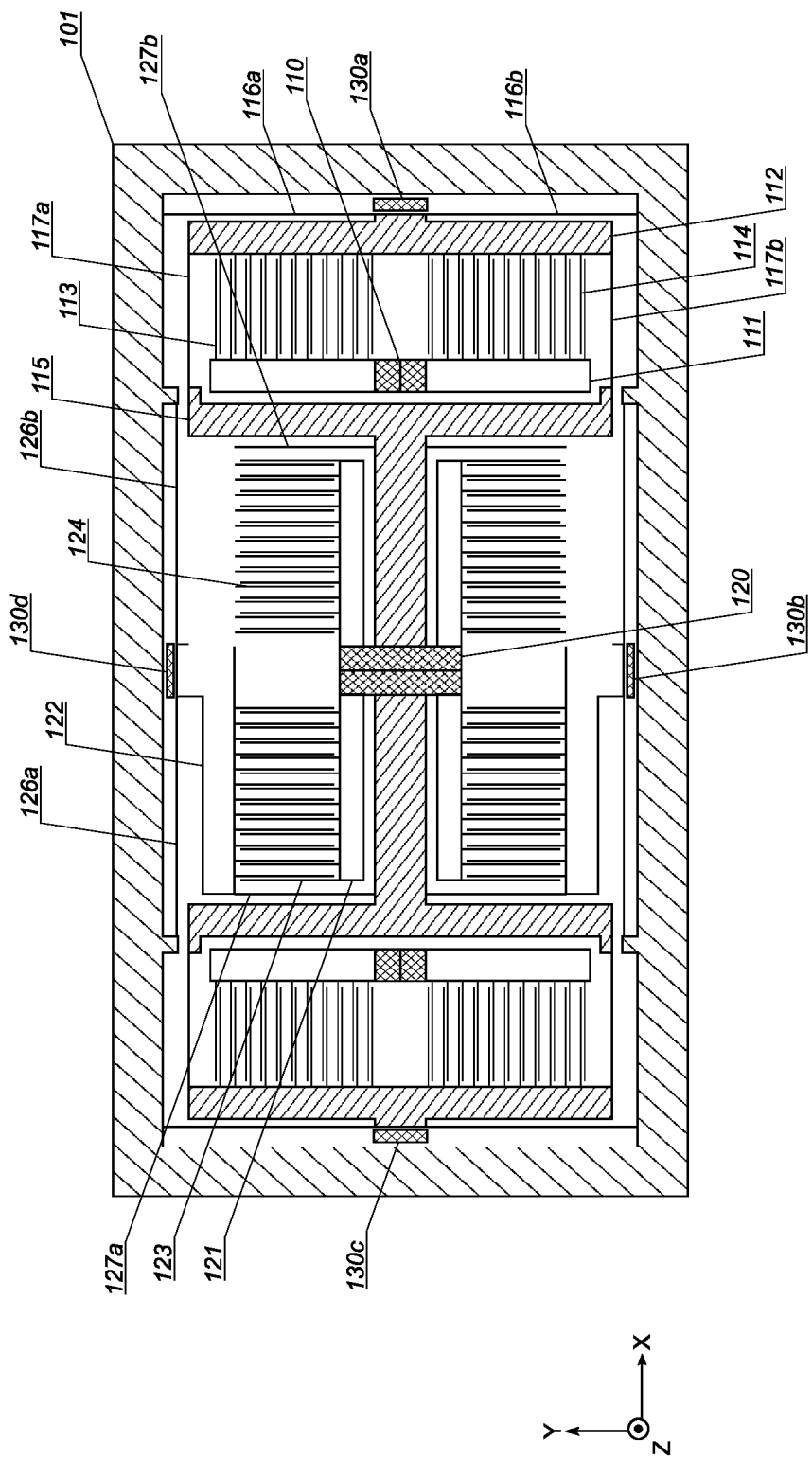
FIG. 1 depicts a first embodiment of a two-axis MEMS accelerometer according to the present invention.

FIG. 1 depicts a first embodiment of a two-axis MEMS accelerometer according to the present invention. FIG. 1 shows a top-down view of the accelerometer, such that the substrate upon which the accelerometer is formed lies parallel to the plane of the page, i.e. the X-Y plane. The substrate may be silicon or any other suitable material which can be patterned to form the MEMS structures of the accelerometer. The upper surface of the substrate defines a substrate plane, which may be generally flat and parallel to the plane of the page of FIG. 1. The substrate plane may intersect the MEMS structures described in more detail below, or may be located above or below the MEMS structures. The precise vertical position of the substrate plane is not important, only its orientation. The substrate plane is parallel to the X-Y plane, within which the X- and Y-axes discussed below lie. The X- and Y-axes may also be referred to as first and second axes.

The accelerometer includes a proof mass 101 which extends around the exterior of the accelerometer components, i.e. the proof mass 101 encloses the remaining accelerometer components parallel to the substrate plane. The profile of the proof mass 101 parallel to the substrate plane is a regular, symmetrical shape with a hollow centre within which accelerometer components can be located. In the specific example of FIG. 1, proof mass 101 is a rectangle. The proof mass has a thickness perpendicular to the substrate plane, i.e. in the Z axis. The thickness and the vertical position of the proof mass 101 are such that the centre of mass of the proof mass 101 in the Z axis is centred with respect to the spring structures (described in more detail below) which permit the proof mass 101 to move with respect to the substrate. As such, movement of the MEMS accelerometer within the substrate plane does not cause rotation of the proof mass 101 out of parallel with the substrate plane.

As mentioned above, the proof mass 101 is permitted to move with respect to the substrate by a plurality of springs and intervening structures, by which the proof mass is suspended above the substrate. In the right half (i.e. the right half on the page) of the accelerometer depicted in FIG. 1, proof mass 101 is connected by springs 116a and 116b to moveable Y-axis measurement structure 112. Moveable Y-axis measurement structure 112 is floating, i.e. it is not directly anchored to the substrate and, as such, is capable of moving with respect to the substrate as permitted by the intervening structures between the moveable Y-axis measurement structure and one or more substrate anchor points. Springs 116a and 116b are shaped such that movement of the proof mass 101 along the Y-axis is strongly mechanically coupled to the moveable Y-axis measurement structure 112, while movement of the proof mass 101 along the X-axis is weakly mechanically coupled to or decoupled from the moveable Y-axis measurement structure 112. The precise shape and form of springs 116a and 116b is described in more detail below. Consequently, springs 116a and 116b permit the proof mass 101 to move along the X-axis relative to the moveable Y-axis measurement structure 112 while resisting movement of proof mass 101 along the Y-axis relative to the moveable Y-axis measurement structure 112. The proof mass 101 and moveable Y-axis measurement structure 112 are therefore said to be mechanically coupled in the Y-axis and mechanically decoupled in the X-axis.

Moveable Y-axis measurement structure 112 is in turn connected by spring 117a and 117b to fixed support structure 115. Springs 117a and 117b are shaped such that movement of the moveable Y-axis measurement 112 structure along the X-axis is strongly mechanically coupled to the fixed support structure 115, while movement of the moveable Y-axis measurement structure 112 along the Y-axis is weakly mechanically coupled to or decoupled from the fixed support structure 115. Again, the precise shape and form of springs 117a and 117b is described in more detail below. Consequently, springs 117a and 117b permit moveable Y-axis measurement structure 112 to move along the Y-axis relative to the fixed support structure 115 while resisting movement of the moveable Y-axis measurement structure 112 along the X-axis relative to the fixed support structure 115. The moveable Y-axis measurement structure 112 and fixed support structure 115 are therefore said to be mechanically coupled in the X-axis and mechanically decoupled in the Y-axis.

Fixed support structure 115 is connected to the substrate via anchor point(s) 120. As such, the fixed support structure is fixed with respect to the substrate. Furthermore, the body and arms of the fixed support structure which extend away from the anchor point are sufficiently rigid that the body and arms of the fixed support structure move by such a small amount relative to the substrate that they too can be thought of as fixed. Consequently, the proof-mass is connected via springs 116a, 116b, moveable Y-axis measurement structure 112 and springs 117a, 117b to the fixed support structure 115 and the substrate. Since springs 116a and 116b permit decoupled movement of the proof mass 101 and the moveable Y-axis measurement structure 112 in X-axis, and springs 117a and 117b permit decoupled movement of the moveable Y-axis measurement structure 112 and fixed measurement structure 115 (and therefore also the substrate) in the Y-axis, the proof mass 101 is decoupled from the fixed measurement structure 115 (and the substrate) in both the X- and Y-axes by springs 116a, 116b, moveable Y-axis measurement structure 112 and springs 117a, 117b.

The same structure as described above with respect to the right half of the accelerometer of FIG. 1 is repeated on the left side of the accelerometer, reflected about a central vertical axis of the accelerometer. The accelerometer therefore includes two moveable Y-axis measurement structures 112 and two sets of springs 116a, 116b, 117a and 117b. The accelerometer may include a separate fixed support structure 115 to which the left-side springs 117a and 117b are connected, of the fixed support structure may be a unitary element which extends symmetrically across both sides of the accelerometer.

In the upper half (i.e. upper half on the page) of the accelerometer depicted in FIG. 1, proof mass 101 is connected by springs 126a and 126b to moveable X-axis measurement structure 122. Moveable X-axis measurement structure 122 is floating, i.e. it is not directly anchored to the substrate and, as such, is capable of moving with respect to the substrate as permitted by the intervening structures between the moveable X-axis measurement structure and one or more substrate anchor points. Springs 126a and 126b are shaped such that movement of the proof mass 101 along the X-axis is strongly mechanically coupled to the moveable X-axis measurement structure 122, while movement of the proof mass 101 along the Y-axis is weakly mechanically coupled to or decoupled from the moveable X-axis measurement structure 122. The precise shape and form of springs 126a and 126b is described in more detail below. Consequently, springs 126a and 126b permit the proof mass 101 to move along the Y-axis relative to the moveable X-axis measurement structure 122 while resisting movement of proof mass 101 along the X-axis relative to the moveable X-axis measurement structure 122. The proof mass 101 and moveable X-axis measurement structure 122 are therefore said to be mechanically coupled in the X-axis and mechanically decoupled in the Y-axis.

Moveable X-axis measurement structure 122 is in turn connected by spring 127a and 127b to fixed support structure 115. Springs 127a and 127b are shaped such that movement of the moveable X-axis measurement 122 structure along the Y-axis is strongly mechanically coupled to the fixed support structure 115, while movement of the moveable X-axis measurement structure 122 along the X-axis is weakly mechanically coupled to or decoupled from the fixed support structure 115. Again, the precise shape and form of springs 127a and 127b is described in more detail below. Consequently, springs 127a and 127b permit moveable X-axis measurement structure 122 to move along the X-axis relative to the fixed support structure 115 while resisting movement of the moveable X-axis measurement structure 122 along the Y-axis relative to the fixed support structure 115. The moveable X-axis measurement structure 122 and fixed support structure 115 are therefore said to be mechanically coupled in the Y-axis and mechanically decoupled in the X-axis.

As explained above, fixed support structure 115 is connected to the substrate via anchor point(s) 120. As such, the fixed support structure is fixed with respect to the substrate. Consequently, the proof-mass is connected via springs 126a, 126b, moveable X-axis measurement structure 122 and springs 127a, 127b to the fixed support structure 115 and the substrate. Since springs 126a and 126b permit decoupled movement of the proof mass 101 and the moveable X-axis measurement structure 122 in Y-axis, and springs 127a and 127b permit decoupled movement of the moveable X-axis measurement structure 122 and fixed measurement structure 115 (and therefore also the substrate) in the X-axis, the proof mass 101 is decoupled from the fixed measurement structure 115 (and the substrate) in both the X- and Y-axes by springs 126a, 126b, moveable X-axis measurement structure 122 and springs 127a, 127b.

The same structure as described above with respect to the upper half of the accelerometer of FIG. 1 is repeated on the lower half of the accelerometer, reflected about a central horizontal axis of the accelerometer. The accelerometer therefore includes two moveable X-axis measurement structures 122 and two sets of springs 126a, 126b, 127a and 127b. The accelerometer may include a separate fixed support structure 115 to which the lower-half springs 127a and 127b are connected, of the fixed support structure may be a unitary element which extends symmetrically across both upper and lower halves of the accelerometer (as well as across both left and right sides).

Springs 116a, 116b, 117a, 117b, 126a, 126b, 127a and 127b are also shaped to minimise deflection of the springs in Z-axis, i.e. to prevent movement of the moveable X-axis measurement structure 122 and the proof mass 101 in the Z-axis. Preferably, springs 116a, 116b, 117a, 117b, 126a, 126b, 127a and 127b are beam-shaped, with a rectangular cross-section (taken perpendicular to the longitudinal axis of the beam) having a smaller width (in the X- or Y-axis) than height (in the Z-axis).

As an alternative, folded springs may be used, which make the spring softer in same proportion with the number of springs in series. The width of the spring array dictates the softness in the cross-axis direction.

As a further alternative, box springs may be used Box strings are stiffer in the cross-axis direction than folded springs, but are also stiffer in the measuring axis.

The length of the springs is set to control the spring constant, i.e. to control the mechanical sensitivity of the accelerometer to acceleration, in combination with all the other springs in series decoupling the mass from the anchor.

For springs 117a, 117b, 126a and 126b, whose longitudinal axis extends in the X-direction, the width of the beam in the Y-direction is narrower such that the beam-shaped spring is easily deformed in the Y-direction, while the height of the beam in the Z-direction resists deformation of the springs in the Z-direction. Furthermore, since the springs are is beam-shaped, i.e. forms a generally straight line in the X-direction, the springs 117a, 117b, 126a and 126 resist deformation in the X-direction.

For springs 116a, 116b, 127a and 127b, whose longitudinal axis extends in the Y-direction, the width of the beam in the X-direction is narrower such that the beam-shaped spring is easily deformed in the X-direction, while the height of the beam in the Z-direction resists deformation of the springs in the Z-direction. Furthermore, since the springs are is beam-shaped, i.e. forms a generally straight line in the Y-direction, the springs 116a, 116b, 127a and 127b resist deformation in the Y-direction.

While the shape of the springs has been described as beam-shaped, any suitable shape can be used as long as the spring exhibits the properties of stiffness in one of the X- or Y-directions and the Z-direction along with relative looseness in the other of the X- or Y-directions.

The accelerometer also includes fixed Y-axis measurement structures 111 and fixed X-axis measurement structures 121. Fixed X-axis measurement structures 121 are preferably anchored to the substrate at anchor point(s) 120, along with the fixed support structure 115. A common central anchor point prevents thermal (or other) deformation of the substrate from changing the relative positions of the fixed support structure and the fixed X-axis measurement structures 121.

Fixed Y-axis measurement structures 111 are fixed to the substrate via anchor point(s) 110, which are separated from the anchor point(s) 120 along the X-axis, but still located on the central X-axis of the accelerometer.

Comb electrodes extend from the fixed Y-axis measurement structures 111 are and from the moveable Y-axis measurement structures. Similarly, comb electrodes extend from fixed X-axis measurement structures 121 and from moveable X-axis measurement structures 122. The comb electrodes define a plurality of fingers which extend away from the fixed and moveable measurement structures, such that the fingers of comb electrodes which extend away from the fixed X- and Y-axis measurement structures extend towards the moveable X- and Y-axis measurement structures respectively. Similarly, the fingers of comb electrodes which extend away from the moveable X- and Y-axis measurement structures extend towards the fixed X- and Y-axis measurement structures respectively. The fingers of opposing comb electrodes are interspersed and not in direct electrical contact. The comb electrodes form comb sense capacitors, which are used to measure movement of the moveable X-axis measurement structures 122 relative to the fixed X-axis measurement structures 121 and to measure movement of the moveable Y-axis measurement structures 112 relative to the fixed Y-axis measurement structures. Specifically, the comb fingers which extend from the fixed and moveable Y-axis measurement structures define two comb sense capacitors 113 and 114. Capacitor 113 is formed from the comb fingers extending from the fixed and moveable Y-axis measurement structures in the upper half of the accelerometer as shown in FIG. 1. Capacitor 114 is formed from the comb fingers extending from the fixed and moveable Y-axis measurement structures in the lower half of the accelerometer as shown in FIG. 1. The arrangement of comb fingers in capacitor 113 is opposite to the arrangement of comb fingers in capacitor 114. As such, when the accelerometer undergoes acceleration in the Y-direction, if the comb fingers of capacitor 113 move closer together, the comb teeth of capacitor 114 move further apart and vice versa.

The same arrangement is provided for X-axis comb sense capacitors 123 and 124. Capacitor 123 is formed from the comb fingers extending from the fixed and moveable X-axis measurement structures in the left half of the accelerometer as shown in FIG. 1. Capacitor 124 is formed from the comb fingers extending from the fixed and moveable X-axis measurement structures in the right half of the accelerometer as shown in FIG. 1. The arrangement of comb fingers in capacitor 123 is opposite to the arrangement of comb fingers in capacitor 124. As such, when the accelerometer undergoes acceleration in the X-direction, if the comb fingers of capacitor 123 move closer together, the comb teeth of capacitor 124 move further apart and vice versa.

As the proof mass 101 moves relative to the substrate due to external acceleration applied to the MEMS accelerometer, the moveable X- and Y-axis measurement structures also move relative to the substrate—and relative to the fixed X- and Y-axis measurement structures—thereby changing the capacitance of the sense comb capacitors in response to the movement.

The sense axis of each comb sense capacitor is perpendicular to the longitudinal axis of the capacitor's comb fingers. However, capacitance of the comb sense capacitors changes with both relative movement of the comb fingers along the sense axis and relative movement of the comb fingers perpendicular to the sense axis. In prior art accelerometers, use a single proof mass for multiple sense axes introduced cross-axis error, where movement of the proof mass and moveable measurement structures out of the sense axis of a given sense capacitor produces and error due to the parasitic change in capacitance caused by movement of the sense axis combs away from each other perpendicular to the sense axis.

The accelerometer of FIG. 1 solves this problem in two ways: by mechanically decoupling the movement measurement structures from movement of the proof mass 101 perpendicular to the sense axis, and by using four sense comb capacitors for each sense axis that are reflected about both the X and Y sense axes.

More specifically, as the proof mass 101 moves relative to the substrate, any movement of the proof mass 101 in the X-direction is strongly mechanically coupled to the moveable X-axis measurement structures 122 by spring 126a and 126b, while movement of the proof mass 101 in the Y-direction is weakly coupled to or decoupled from the moveable X-axis measurement structures 122. That is, movement of the proof mass 101 in the X-direction causes a corresponding movement of the moveable X-axis measurement structures 122, while movement of the proof mass in the Y-direction causes no or very little movement of the moveable X-axis measurement structures 122 in the Y-direction, and thus no or very little change of capacitance in the X-axis sense capacitor due the acceleration in the Y-direction.

Similarly, any movement of the proof mass 101 in the Y-direction is strongly mechanically coupled to the moveable Y-axis measurement structures 112 by spring 116a and 116b, while movement of the proof mass 101 in the X-direction is weakly coupled to or decoupled from the moveable Y-axis measurement structures 112. That is, movement of the proof mass 101 in the Y-direction causes a corresponding movement of the moveable Y-axis measurement structures 112, while movement of the proof mass in the X-direction causes no or very little movement of the moveable Y-axis measurement structures 122 in the X-direction, and thus no or very little change of capacitance in the Y-axis sense capacitor due the acceleration in the X-direction.

Furthermore, any remaining movement of the moveable X-axis measurement structures 122 in the Y-direction is cancelled out, since as the comb fingers of the upper-half X-axis sense capacitor move closer together, the comb fingers of the lower-half X-axis sense capacitor move further apart by an equal amount, and vice versa.

In the same way any remaining movement of the moveable Y-axis measurement structures 112 in the X-direction is cancelled out, since as the comb fingers of the right-side Y-axis sense capacitor move closer together, the comb fingers of the left-side Y-axis sense capacitor move further apart by an equal amount, and vice versa.

Furthermore, this arrangement of comb fingers in comb sense capacitors 113, 114 and 123, 124 enables the use of double differential capacitance measurements to cancel out errors produced by imperfections during manufacture of the device. The use of double differential measurements is described in more detail with respect to FIG. 4 below, but is equally applicable to the embodiment of FIG. 1.

As a further improvement, the accelerometer of FIG. 1 also, optionally, includes stoppers 130a-d, which may be anchored to the substrate. Stoppers 130a-d are positioned adjacent to the moveable X-axis measurement structures 122 and moveable Y-axis measurement structures 112. Stoppers 130a-d restrict movement of the moveable X- and Y-axis measurement structures in at least one direction perpendicular to the sense axis parallel to the substrate plane. Stoppers 130a-d are depicted located between the moveable X- and Y-axis measurement structures 122, 112 and the proof mass 101. Stoppers 130a-d therefore restrict movement of the moveable X- and Y-axis measurement structures in directions perpendicular to the sense axis and towards the exterior of the accelerometer. Additional stoppers may also be included which restrict movement of the moveable X- and Y-axis measurement structures in directions perpendicular to the sense axis and towards the interior of the accelerometer, e.g. located adjacent to the moveable X- and Y-axis measurement structures, between the moveable X- and Y-axis measurement structures and the fixed X- and Y-axis measurement structures or the fixed support structure(s) 115.

Alternatively, or additionally, the device may include relative stoppers which extend from a proof mass or other structure to prevent relative movement of the proof mass/structure and adjacent structures.

Alternatively, stoppers may be positioned outside the proof mass 101 and anchored to the substrate.

Furthermore, stoppers may be attached to the cap wafer of the device in addition to or instead of being attached to the substrate.

Figure 2:
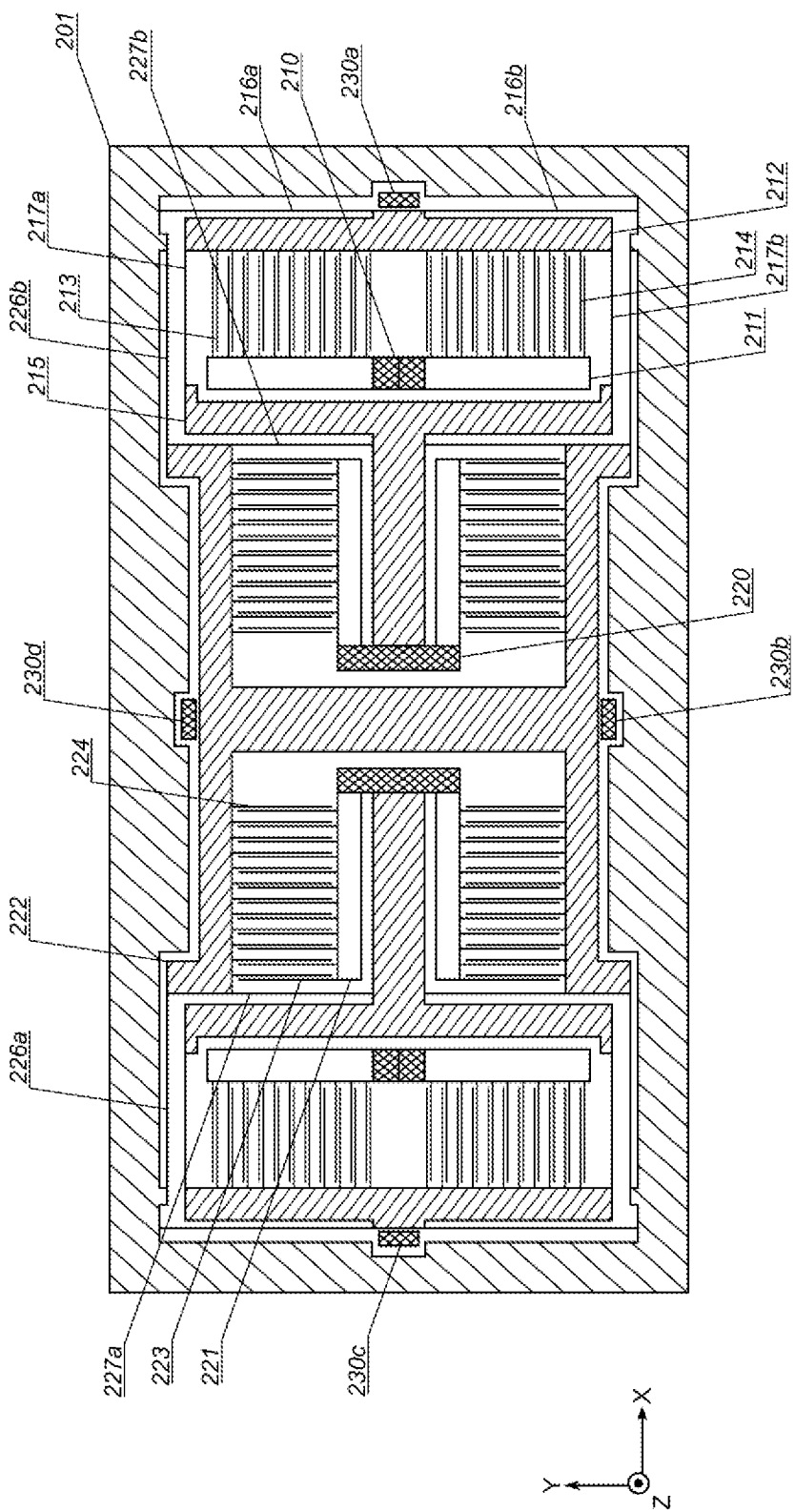
FIG. 2 depicts a second embodiment of a two-axis MEMS accelerometer according to the present invention.

FIG. 2 depicts a second embodiment of a two-axis MEMS accelerometer according to the present invention. Similarly to the accelerometer of FIG. 1, the accelerometer of FIG. 2 includes a proof mass 201 which extends around the exterior of the accelerometer components, i.e. the proof mass 201 encloses the remaining accelerometer components parallel to the substrate plane. The profile of the proof mass 201 parallel to the substrate plane is a regular, symmetrical shape with a hollow centre within which accelerometer components can be located. In the specific example of FIG. 2, proof mass 201 is a rectangle. The proof mass has a thickness perpendicular to the substrate plane, i.e. in the Z axis. The thickness and the vertical position of the proof mass 201 are such that the centre of mass of the proof mass 201 in the Z axis is centred with respect to the spring structures (described in more detail below) which permit the proof mass 201 to move with respect to the substrate. As such, movement of the MEMS accelerometer within the substrate plane does not cause rotation of the proof mass 201 out of parallel with the substrate plane.

The proof mass 201 is permitted to move with respect to the substrate by a plurality of springs and intervening structure, by which the proof mass is suspended above the substrate. In the right half (i.e. the right half on the page) of the accelerometer depicted in FIG. 2, proof mass 201 is connected by springs 216a and 216b to moveable Y-axis measurement structure 212. Moveable Y-axis measurement structure 212 is floating, i.e. it is not directly anchored to the substrate and, as such, is capable of moving with respect to the substrate as permitted by the intervening structures between the moveable Y-axis measurement structure 212 and one or more substrate anchor points. Springs 216a and 216b are shaped such that movement of the proof mass 201 along the Y-axis is strongly mechanically coupled to the moveable Y-axis measurement structure 212, while movement of the proof mass 201 along the X-axis is weakly mechanically coupled to or decoupled from the moveable Y-axis measurement structure 212. The precise shape and form of springs 216a and 216b is the same as described above with respect to the springs 116a, 116b, 117a, 117b, 126a, 1276b, 127a and 127b of FIG. 1.

Consequently, springs 216a and 216b permit the proof mass 201 to move along the X-axis relative to the moveable Y-axis measurement structure 212 while resisting movement of proof mass 201 along the Y-axis relative to the moveable Y-axis measurement structure 212. The proof mass 201 and moveable Y-axis measurement structure 212 are therefore said to be mechanically coupled in the Y-axis and mechanically decoupled in the X-axis.

Moveable Y-axis measurement structure 212 is in turn connected by spring 217a and 217b to fixed support structure 215. Springs 217a and 217b are shaped such that movement of the moveable Y-axis measurement 212 structure along the X-axis is strongly mechanically coupled to the fixed support structure 215, while movement of the moveable Y-axis measurement structure 212 along the Y-axis is weakly mechanically coupled to or decoupled from the fixed support structure 215. Again, the precise shape and form of springs 217a and 217b is the same as described above with respect to the springs 116a, 116b, 117a, 117b, 126a, 1276b, 127a and 127b of FIG. 1.

Consequently, springs 217a and 217b permit moveable Y-axis measurement structure 212 to move along the Y-axis relative to the fixed support structure 215 while resisting movement of the moveable Y-axis measurement structure 212 along the X-axis relative to the fixed support structure 215. The moveable Y-axis measurement structure 212 and fixed support structure 215 are therefore said to be mechanically coupled in the X-axis and mechanically decoupled in the Y-axis.

Fixed support structure 215 is connected to the substrate via anchor point(s) 220. As such, the fixed support structure is fixed with respect to the substrate. Furthermore, the body and arms of the fixed support structure 215 which extend away from the anchor point 220 are sufficiently rigid that the body and arms of the fixed support structure move by such a small amount relative to the substrate that they too can be thought of as fixed. Consequently, the proof-mass is connected via springs 216a, 216b, moveable Y-axis measurement structure 212 and springs 217a, 217b to the fixed support structure 215 and the substrate. Since springs 216a and 216b permit decoupled movement of the proof mass 201 and the moveable Y-axis measurement structure 212 in X-axis, and springs 217a and 217b permit decoupled movement of the moveable Y-axis measurement structure 212 and fixed measurement structure 215 (and therefore also the substrate) in the Y-axis, the proof mass 201 is decoupled from the fixed measurement structure 215 (and the substrate) in both the X- and Y-axes by springs 216a, 216b, moveable Y-axis measurement structure 212 and springs 217a, 217b.

The same structure as described above with respect to the right half of the accelerometer of FIG. 2 is repeated on the left side of the accelerometer, reflected about a central vertical axis of the accelerometer. The accelerometer therefore includes two moveable Y-axis measurement structures 212 and two sets of springs 216a, 216b, 217a and 217b. The accelerometer of FIG. 2 includes a separate fixed support structure 215 to which the left-side springs 217a and 217b are connected, and there is a gap at the centre of the accelerometer between two sets of anchor points 220 to which the two fixed support structures 215 are fixed.

In contrast to the accelerometer of FIG. 1, the accelerometer of FIG. 2 includes a single, unitary moveable X-axis measurement structure 222, shaped like the letter "H" rotated by 90 degrees. The centre bar of the H-shaped moveable X-axis measurement structure 222 extends through the gap between anchor points 220 at the centre of the accelerometer, such that each of the side bar of the H-shaped moveable X-axis measurement structure 222 are located on opposite sides of the anchor points 220, i.e. one "above" the anchor points 220, as seen on the page, and one "below" the anchor points 220, as seen on the page.

In the upper half (i.e. upper half on the page) of the accelerometer and the H-shaped moveable X-axis measurement structure 222 depicted in FIG. 2, proof mass 201 is connected by springs 226a and 226b to moveable X-axis measurement structure 222. Moveable X-axis measurement structure 222 is floating, i.e. it is not directly anchored to the substrate and, as such, is capable of moving with respect to the substrate as permitted by the intervening structures between the moveable X-axis measurement structure 222 and one or more substrate anchor points. Springs 226a and 226b are shaped such that movement of the proof mass 201 along the X-axis is strongly mechanically coupled to the moveable X-axis measurement structure 222, while movement of the proof mass 201 along the Y-axis is weakly mechanically coupled to or decoupled from the moveable X-axis measurement structure 222. The precise shape and form of springs 226a and 226b is the same as described above for the springs of FIG. 1 and for springs 216a, 216b, 217a and 217b. Consequently, springs 226a and 226b permit the proof mass 201 to move along the Y-axis relative to the moveable X-axis measurement structure 222 while resisting movement of proof mass 201 along the X-axis relative to the moveable X-axis measurement structure 222. The proof mass 201 and moveable X-axis measurement structure 222 are therefore said to be mechanically coupled in the X-axis and mechanically decoupled in the Y-axis.

Moveable X-axis measurement structure 222 is in turn connected by springs 227a and 227b to fixed support structures 215. As shown in FIG. 2, spring 227a connects the moveable X-axis measurement structure 222 to the left-hand side fixed support structure, while spring 227b connected the moveable X-axis measurement structure 222 to the right-hand side fixed support structure 215. Springs 227a and 227b are shaped such that movement of the moveable X-axis measurement 222 structure along the Y-axis is strongly mechanically coupled to the fixed support structures 215, while movement of the moveable X-axis measurement structure 222 along the X-axis is weakly mechanically coupled to or decoupled from the fixed support structures 2115. Again, the precise shape and form of springs 227a and 227b is the same as described above for the springs of FIG. 1 and the other springs of FIG. 2. Consequently, springs 227a and 227b permit moveable X-axis measurement structure 222 to move along the X-axis relative to the fixed support structures 215 while resisting movement of the moveable X-axis measurement structure 222 along the Y-axis relative to the fixed support structures 215. The moveable X-axis measurement structure 222 and fixed support structures 215 are therefore said to be mechanically coupled in the Y-axis and mechanically decoupled in the X-axis.

As explained above, fixed support structures 215 are connected to the substrate via anchor points 220. As such, the fixed support structures are fixed with respect to the substrate. Consequently, the proof mass 201 is connected via springs 226a, 226b, moveable X-axis measurement structure 222 and springs 227a, 227b to the fixed support structures 215 and the substrate. Since springs 226a and 226b permit decoupled movement of the proof mass 201 and the moveable X-axis measurement structure 222 in Y-axis, and springs 227a and 227b permit decoupled movement of the moveable X-axis measurement structure 222 and fixed measurement structures 215 (and therefore also the substrate) in the X-axis, the proof mass 201 is decoupled from the fixed measurement structures 215 (and the substrate) in both the X- and Y-axes by springs 226a, 226b, moveable X-axis measurement structure 222 and springs 227a, 227b.

The same structure as described above with respect to the upper half of the accelerometer of FIG. 1 is repeated on the lower half of the accelerometer, reflected about a central horizontal axis of the accelerometer. The accelerometer therefore includes a second set of springs 226a, 226b, 227a and 227b which are connected to the H-shaped moveable X-axis measurement structure 222 and the fixed support structures 215.

Springs 217a, 217b, 226a and 226b, whose longitudinal axes extend in the X-direction, the width of the beam in the Y-direction is narrower such that the beam-shaped spring is easily deformed in the Y-direction, while the height of the beam in the Z-direction resists deformation of the springs in the Z-direction. Furthermore, since the springs are is beam-shaped, i.e. forms a generally straight line in the X-direction, the springs 217a, 217b, 226a and 226 resist deformation in the X-direction.

For springs 216a, 216b, 227a and 227b, whose longitudinal axes extend in the Y-direction, the width of the beam in the X-direction is narrower such that the beam-shaped spring is easily deformed in the X-direction, while the height of the beam in the Z-direction resists deformation of the springs in the Z-direction. Furthermore, since the springs are is beam-shaped, i.e. forms a generally straight line in the Y-direction, the springs 216a, 216b, 227a and 227b resist deformation in the Y-direction.

While the shape of the springs has been described as beam-shaped, any suitable shape can be used as long as the spring exhibits the properties of stiffness in one of the X- or Y-directions and the Z-direction along with relative looseness in the other of the X- or Y-directions.

The accelerometer of FIG. 2 also includes fixed Y-axis measurement structures 211 and fixed X-axis measurement structures 221. Fixed X-axis measurement structures 221 are preferably anchored to the substrate at anchor points 220, along with the fixed support structures 215. The accelerometer of FIG. 2 includes four fixed X-axis measurement structures 221. The four fixed X-axis measurement structures 221 can be divided into two pairs, each pair being located on opposite sides of the central bar of the H-shaped moveable X-axis measurement structure. Within each pair of fixed X-axis measurement structures 221, the fixed X-axis measurement structures 221 are located on opposite sides of the fixed support structure 215.

Fixed Y-axis measurement structures 211 are fixed to the substrate via anchor points 210, which are separated from the anchor points 220 along the X-axis, but still located on the central X-axis of the accelerometer.

Comb electrodes extend from the fixed Y-axis measurement structures 211 and from the moveable Y-axis measurement structures 212. Similarly, comb electrodes extend from fixed X-axis measurement structures 221 and from the moveable X-axis measurement structure 222

The comb electrodes form comb sense capacitors 213, 214, 223 and 224, in the same manner as described above for sense capacitors 113, 114, 123 and 124 with respect to FIG. 1.

As the proof mass 201 moves relative to the substrate due to external acceleration applied to the MEMS accelerometer, the moveable X- and Y-axis measurement structures also move relative to the substrate—and relative to the fixed X- and Y-axis measurement structures—thereby changing the capacitance of the sense comb capacitors in response to the movement.

The present invention solves the problem reducing errors due to parasitic capacitance, i.e. of cross-axis error, which is described above with respect to FIG. 1, and of parasitic capacitance caused by rotation of the proof mass and measurement structures, in three ways: by mechanically decoupling the movement measurement structures from movement of the proof mass 201 perpendicular to the sense axis, by using two sense comb capacitors for each sense axis that are reflected about the sense axis, and by producing a different natural frequency of oscillation of the structure (i.e. the proof mass 201 and moveable measurement structures 212, 222) in the X and Y directions compared to the natural frequency of rotation of the structure about the Z-axis.

More specifically, as the proof mass 201 moves relative to the substrate, any movement of the proof mass 201 in the X-direction is strongly mechanically coupled to the moveable X-axis measurement structure 222 by four springs 226a, 226b, and movement of the proof mass 201 in the Y-direction is weakly coupled to or decoupled from the moveable X-axis measurement structure 222. That is, movement of the proof mass 101 in the X-direction causes a corresponding movement of the moveable X-axis measurement structure 222, while movement of the proof mass 201 in the Y-direction causes no or very little movement of the moveable X-axis measurement structures 222 in the Y-direction, and thus no or very little change of capacitance in the X-axis sense capacitor due the acceleration in the Y-direction.

Similarly, any movement of the proof mass 201 in the Y-direction is strongly mechanically coupled to the moveable Y-axis measurement structures 212 by springs 116a and 116b, while movement of the proof mass 201 in the X-direction is weakly coupled to or decoupled from the moveable Y-axis measurement structures 212. That is, movement of the proof mass 201 in the Y-direction causes a corresponding movement of the moveable Y-axis measurement structures 212, while movement of the proof mass in the X-direction causes no or very little movement of the moveable Y-axis measurement structures 222 in the X-direction, and thus no or very little change of capacitance in the Y-axis sense capacitor due the acceleration in the X-direction.

Furthermore, any remaining movement of the moveable X-axis measurement structure 222 in the Y-direction is cancelled out, since as the comb fingers of the upper-half X-axis sense capacitors move closer together, the comb fingers of the lower-half X-axis sense capacitors move further apart by an equal amount, and vice versa.

In the same way any remaining movement of the moveable Y-axis measurement structures 212 in the X-direction is cancelled out, since as the comb fingers of the right-side Y-axis sense capacitor move closer together, the comb fingers of the left-side Y-axis sense capacitor move further apart by an equal amount, and vice versa.

Furthermore, as described above with respect to FIG. 1, the arrangement of sense capacitors 213, 214, 223 and 224 enables the use of double differential measurements, which cancels out errors causes due to manufacturing imperfections and misalignment.

Finally, due to the change in the structure of the proof mass and its connections to the moveable measurement structures compared to the device of FIG. 1, the natural frequency of rotation of the structure (i.e. proof mass 201 and moveable measurement structures 212, 222) is significantly higher than the natural frequency of oscillation of the proof mass 201 and moveable measurement structures 212, 222 in the X- and Y-axes. Thus, it is easier to filter out the parasitic signal produced by the capacitors as a result of rotation, improving the accuracy of the X- and Y-axis acceleration measurements.

As in the accelerometer of FIG. 1, the accelerometer of FIG. 2 may also include stoppers 230a-d, which are anchored to the substrate. Stoppers 230a-d are positioned adjacent to the moveable X-axis measurement structure 222 and moveable Y-axis measurement structures 212. Stoppers 230b and 230d restrict movement of the moveable X-axis measurement structure 222 in both directions along the Y axis. Stoppers 230a and 230c restrict movement of each moveable Y-axis measurement structure in at least one direction perpendicular along the Y-axis. Stoppers 230a-d are depicted located between the moveable X- and Y-axis measurement structures 222, 212 and the proof mass 201. Additional stoppers may also be included which restrict movement of the moveable Y-axis measurement structures 212 in directions perpendicular to the sense axis and towards the interior of the accelerometer, e.g. located adjacent to the moveable Y-axis measurement structures 212, between the moveable Y-axis measurement structures 212 and the fixed Y-axis measurement structures 211 or the fixed support structures 215.

Figure 3:
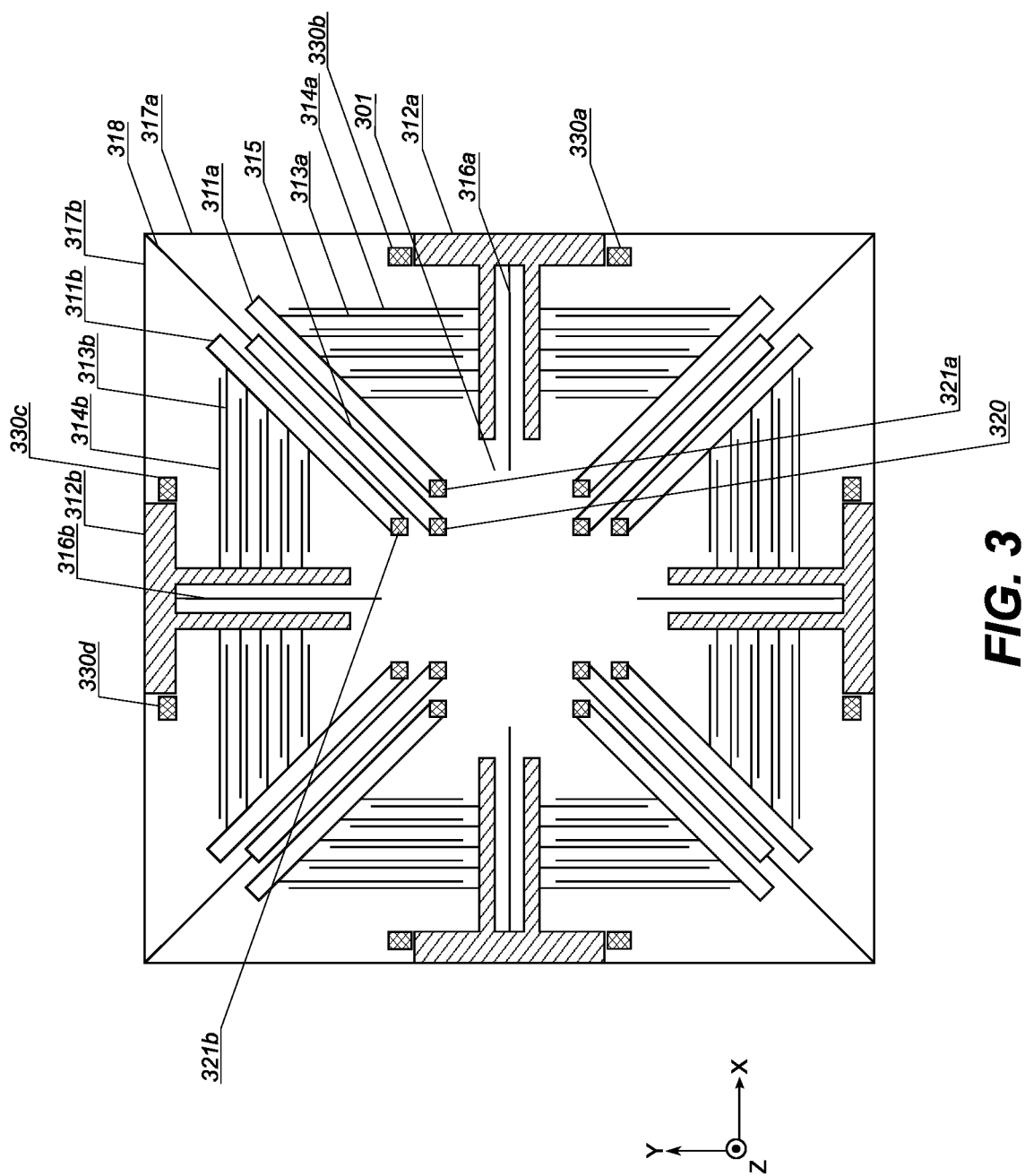
FIG. 3 depicts a third embodiment of a two-axis MEMS accelerometer according to the present invention.

FIG. 3 depicts a third embodiment of a two-axis MEMS accelerometer according to the present invention. FIG. 3 shows a top-down view of the accelerometer, such that the substrate upon which the accelerometer is formed lies parallel to the plane of the page, i.e. the X-Y plane. The substrate may be silicon or any other suitable material which can be patterned to form the MEMS structures of the accelerometer. The upper surface of the substrate defines a substrate plane, which may be generally flat and parallel to the plane of the page of FIG. 3. The substrate plane may intersect the MEMS structures described in more detail below, or may be located above or below the MEMS structures. The precise vertical position of the substrate plane is not important, only its orientation.

The accelerometer includes a proof mass 301 which is located centrally within the accelerometer. The proof mass is depicted as a cross shape in FIG. 3, although any shape which allows the proof mass to move within the required range within the centre of the device without colliding with other components may be used.

The proof mass 301 is permitted to move within the accelerometer, relative to the substrate, by a plurality of springs and intervening structures, by which the proof mass is suspended above the substrate. The proof mass 301 is connected by spring 316a to a moveable X-axis measurement structure 312a and by spring 316b to a moveable Y-axis measurement structure 312b. Springs 316a and 316b extend away from the proof mass at a 90-degree angle to one another and have the same length. Moveable X-axis measurement structure 312a and moveable Y-axis measurement structure 312b have the same shape, but moveable Y-axis measurement structure 312b is a 90-degree counter-clockwise rotation of moveable X-axis measurement structure 312a.

From the moveable X-axis measurement structure 312a a spring 317a extends at an angle of 90 degrees from the spring 316a and towards a corner of the device. From the moveable Y-axis measurement structure 312b a spring 317b extends at an angle of 90 degrees from the spring 316b towards the same corner of the device as spring 317a. Springs 317a and 317b meet and are joined at the corner of the device. Springs 316a, 316b, 317a and 317b therefore lie on the edges of a quadrilateral.

From the corner of the device where springs 317a and 317b meet, another spring 318 extends toward the centre of the device, where it is joined to a fixed support structure 315, which is anchored to the substrate at anchor point 320. Fixed structure 315 extends from the anchor point 320 towards the corner of the device where springs 317a and 317b meet.

This same structure is repeated with four-fold symmetry around the centre of the accelerometer device. However, springs 316a and 316b and moveable X- and Y-axis measurement structures, which form the edges of the repeated structure, are not necessarily duplicated. Instead, spring 316a of one corner also performs the function of spring 316b of the adjacent corner and so on. Thus, there are four springs in total which extend from the proof mass 301 to two moveable X-axis measurement structures 312a and two moveable Y-axis measurement structures 312b in the manner described above.

In this way, the proof mass is suspended from the anchor points 320 via springs 318, 317a and 317b, moveable X- and Y-axis measurements structures 312a and 312, and springs 316a and 316b. The springs are shaped, as described above with respect to FIGS. 1 and 2, as beams, such that the springs easily deform perpendicular to their longitudinal axes and parallel to the X-Y plane, while resisting deformation in the Z-direction and resisting deformation along their longitudinal axes.

As a result, the proof mass is free to move parallel to the X-Y plane, within the bounds set by the easy transverse deformation of the springs. However, the moveable X-axis measurement structures are only mechanically coupled to X-axis movement of the proof mass 301 by springs 316a. Movement of the proof mass 301 along the X-axis is mechanically coupled to moveable X-axis measurement structure 312a due to the resistance to deformation of the springs 316a along their longitudinal axes, which extend in the X-direction. However, movement of the proof mass 301 along the Y-axis is weakly coupled to or mechanically decoupled from the moveable X-axis measurement structures 312a due to the easy deformation of springs 316a in the Y-direction.

Similarly, the moveable Y-axis measurement structures are only mechanically coupled to Y-axis movement of the proof mass 301 by springs 316b. Movement of the proof mass 301 along the Y-axis is mechanically coupled to moveable Y-axis measurement structure 312b due to the resistance to deformation of the springs 316b along their longitudinal axes, which extend in the Y-direction. However, movement of the proof mass 301 along the X-axis is weakly coupled to or mechanically decoupled from the moveable Y-axis measurement structures 312b due to the easy deformation of springs 316b in the X-direction.

The accelerometer also includes fixed X-axis measurement structures 311a and fixed Y-axis measurement structures 311b. Fixed X-axis measurement structure 311a is preferably anchored to the substrate at anchor point 321a. The fixed X-axis measurement structure 311a extends diagonally, parallel to the fixed support structure 315, from the anchor point towards the exterior of the device. Fixed Y-axis measurement structure 311b is preferably anchored to the substrate at anchor points 321b. The fixed Y-axis measurement structure 311b extends diagonally, parallel to the fixed support structure 315 and fixed X-axis measurement structure 311a, from the anchor point towards the exterior of the device.

Extending in the Y-direction from the fixed X-axis measurement structure 311a are comb electrodes 313a (i.e. at a 45-degree angle to the fixed X-axis measurement structure 311*a*), and in the Y-direction from the moveable X-axis measurement structure 312*a* comb electrodes 314*a* extend (at a 90 degree angle from the moveable Y-axis measurement structure). Similarly, from fixed Y-axis measurement structures 311*b* comb electrodes 313*b* extend in the X-direction (at a 45-degree angle from the fixed Y-axis measurement structure 311*b*), and from moveable Y-axis measurement structure 312*b* comb electrodes 114*b* extend in the X-direction (at a 90-degree angle from the moveable Y-axis measurement structure 312*b*). The comb electrodes 113*a*, 113*b*, 114*a* and 114*b* define a plurality of fingers which extend away from the fixed and moveable measurement structures, such that the fingers of comb electrodes 113*a* and 113*b* extend away from the fixed X- and Y-axis measurement structures towards the moveable X- and Y-axis measurement structures respectively. Similarly, the fingers of comb electrodes 114*a* and 114*b* extend away from the moveable X- and Y-axis measurement structures towards the fixed X- and Y-axis measurement structures respectively. The fingers of opposing comb electrodes are interspersed and not in direct electrical contact.

The comb electrodes form comb sense capacitors, which are used to measure movement of the moveable X-axis measurement structures 312*a* relative to the fixed X-axis measurement structures 311*a* and to measure movement of the moveable Y-axis measurement structures 312*b* relative to the fixed Y-axis measurement structures.

The sense axis of each comb sense capacitor is perpendicular to the longitudinal axis of the capacitor's comb fingers. However, capacitance of the comb sense capacitors changes with both relative movement of the comb fingers along the sense axis and relative movement of the comb fingers perpendicular to the sense axis. In prior art accelerometers, use a single proof mass for multiple sense axes introduced cross-axis error, where movement of the proof mass and moveable measurement structures out of the sense axis of a given sense capacitor produces and error due to the parasitic change in capacitance caused by movement of the sense axis combs away from each other perpendicular to the sense axis.

The accelerometer of FIG. 3 solves this problem in two ways: by mechanically decoupling the movement measurement structures from movement of the proof mass 301 perpendicular to the sense axis, and by using two sense comb capacitors for each sense axis that are reflected about the sense axis.

More specifically, as the proof mass 301 moves relative to the substrate, any movement of the proof mass 301 in the X-direction is strongly mechanically coupled to the moveable X-axis measurement structures 312*a* by spring 316*a*, while movement of the proof mass 301 in the Y-direction is weakly coupled to or decoupled from the moveable X-axis measurement structures 312*a*. That is, movement of the proof mass 301 in the X-direction causes a corresponding movement of the moveable X-axis measurement structures 312*a*, while movement of the proof mass in the Y-direction causes no or very little movement of the moveable X-axis measurement structures 312*a* in the Y-direction, and thus no or very little change of capacitance in the X-axis sense capacitor due the acceleration in the Y-direction.

Similarly, any movement of the proof mass 301 in the Y-direction is strongly mechanically coupled to the moveable Y-axis measurement structures 312*b* by spring 316*b*, while movement of the proof mass 301 in the X-direction is weakly coupled to or decoupled from the moveable Y-axis measurement structures 312*b*. That is, movement of the proof mass 301 in the Y-direction causes a corresponding movement of the moveable Y-axis measurement structures 312*b*, while movement of the proof mass in the X-direction causes no or very little movement of the moveable Y-axis measurement structures 312*b* in the X-direction, and thus no or very little change of capacitance in the Y-axis sense capacitor due the acceleration in the X-direction.

Furthermore, any remaining movement of the moveable X-axis measurement structures 312*a* in the Y-direction is cancelled out, since as the comb fingers of the upper-half X-axis sense capacitor move closer together, the comb fingers of the lower-half X-axis sense capacitor move further apart by an equal amount, and vice versa.

In the same way any remaining movement of the moveable Y-axis measurement structures 312*b* in the X-direction is cancelled out, since as the comb fingers of the right-side Y-axis sense capacitor move closer together, the comb fingers of the left-side Y-axis sense capacitor move further apart by an equal amount, and vice versa.

As a further improvement, the accelerometer of FIG. 1 also, optionally, includes stoppers 330*a-d*, which are anchored to the substrate. Stoppers 330*a-d* are positioned adjacent to the moveable X-axis measurement structures 312*a* and moveable Y-axis measurement structures 312*b*. Stoppers 330*a-d* restrict movement of the moveable X- and Y-axis measurement structures perpendicular to the sense axis. Pairs of stoppers 330*a-d* are located adjacent to each moveable X- and Y-axis measurement structure 312*a*, 312*b*, with one stopper on each side of the measurement structure. Stoppers 330*a-d* therefore restrict movement of the moveable X- and Y-axis measurement structures 312*a*, 312*b* in directions perpendicular to the sense axes of the sense capacitors.

Figure 4:
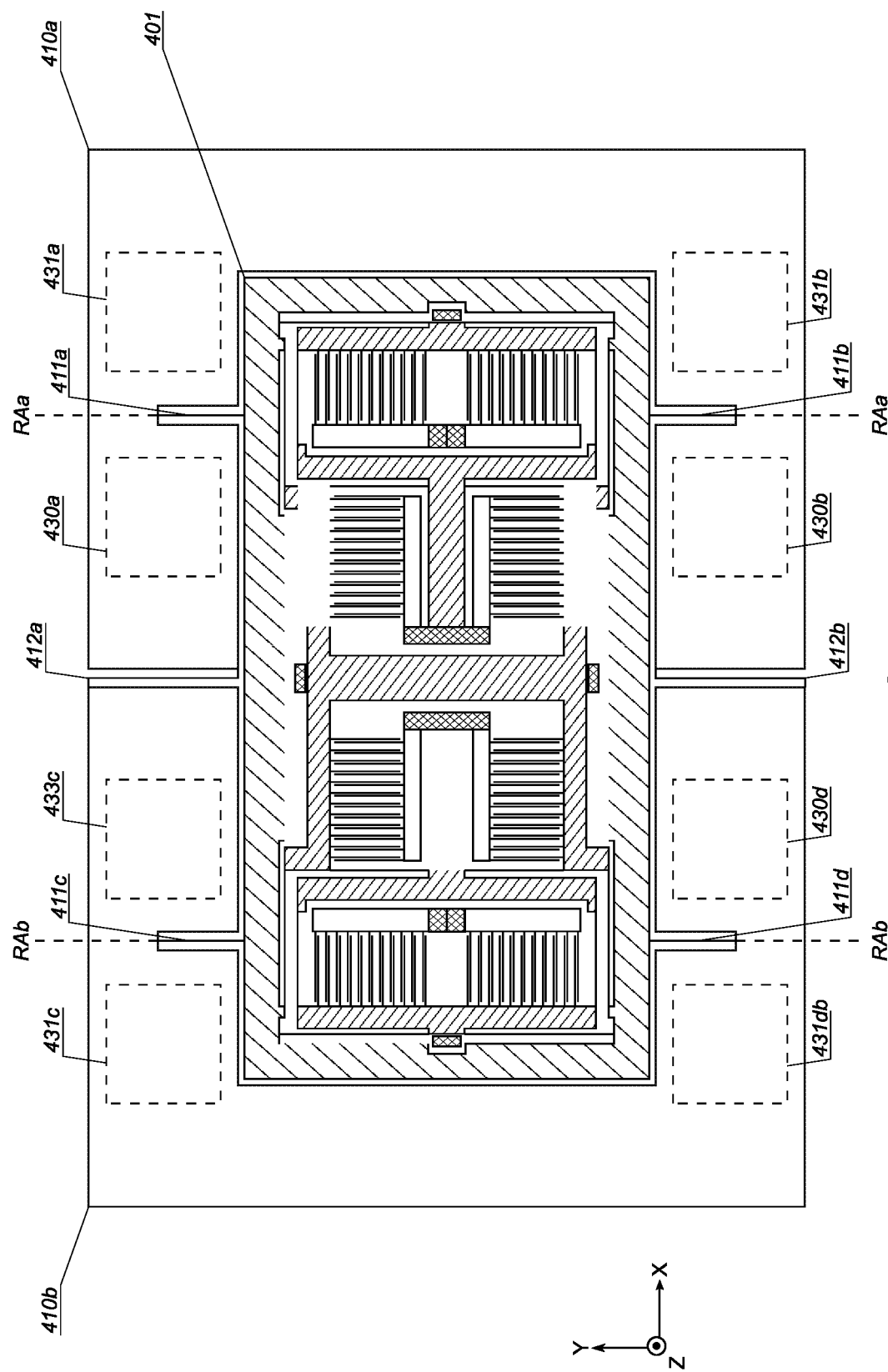
FIG. 4 depicts a three-axis MEMS accelerometer according to the present invention.

FIG. 4 depicts a three-axis MEMS accelerometer according to the present invention. FIG. 4 depicts the two-axis accelerometer of FIG. 2 401 surrounded by two Z-axis proof masses 410*a* and 410*b*. Accelerometer 401 may alternatively be the accelerometer of FIG. 1. The two-axis accelerometer structure 401 and the masses 410*a*, 410*b* (when at rest) generally lie in the same plane parallel to the substrate plane. The proof masses 410*a*, 410*b* are see-saw proof masses and are rotatably coupled to the proof mass of the two-axis accelerometer 401 such that the see-saw proof masses 410*a* and 410*b* can rotate about rotation axes RAa and RAb out of parallel to the substrate plane.

Since the see-saw proof masses 410*a* and 410*b* are connected to the proof mass 401 of the two-axis accelerometer, the proof masses 410*a* and 410*b* are also free to move parallel to the substrate plane relative to the substrate. Thus, the entire mass of both see-saw proof masses 410*a*, 410*b* also acts as a proof mass for the two-axis accelerometer. As a result, the proof mass 401 of the two-axis accelerometer may be reduced in size compared to the embodiments of FIGS. 1 and 2. Furthermore, since the combined proof mass of see-saw proof masses 410*a*, 410*b* and proof mass 401 is used for measurement of acceleration parallel to the substrate plane, i.e. in the X and Y directions, the X- and Y-acceleration measurements are much less susceptible to noise caused by unwanted vibration of the proof mass, e.g. thermal noise.

The see-saw proof masses 410*a*, 410*b* are connected to the two-axis accelerometer proof mass 401 via torsion springs 411*a-d*, which allow rotation of the see-saw proof masses 410*a*, 410*b* out of the substrate plane about rotation axes RAa, RAb. The see-saw proof masses 410*a*, 410*b* are roughly C- or U-shaped and are arranged such that see-saw proof mass 410*b* is a mirror image of see-saw proof mass 410a and so that together the proof masses 410a, 410b extend around the outside of and enclose the two axis accelerometer 401.

The see-saw proof masses 410a, 410b are equally sized, and the torsion springs (and therefore rotation axes RAa and RAb) are located symmetrically about the central Y-axis of the two-axis accelerometer 401. The torsion springs 411a-d are positioned parallel to the substrate plane, at the same height above the substrate plane as the centre of mass of the two-axis accelerometer 401. At rest, the centres of mass of the see-saw proof masses 410a and 410b are also located at the same height above the substrate plane as the torsion springs 411a-d and the centre of mass of the two-axis accelerometer 401. However, parallel to the substrate plane, the centre of mass of see-saw proof mass 410a is offset from its rotation axis RAa, and the centre of mass of see-saw proof mass 410b is equally offset from its rotation axis RAb parallel to the substrate plane, in the opposite direction to the offset of proof mass 410a from rotation axis RAa. Under Z-axis acceleration, the see-saw proof masses 410a, 410b therefore rotate out of parallel with the substrate plane, and this movement can be measurement to determine the Z-axis acceleration.

The see-saw proof masses 410a, 410b can be thought of as each defining an asymmetric mass and a symmetric mass. The symmetric mass is the double the mass of the smaller side of the see-saw proof mass 410a, 410b (i.e. the mass of the smaller side plus an equal mass from the large side which balances the smaller side). The asymmetric mass is the remaining mass of the see-saw proof mass 410a, 410b, i.e. the part of the proof mass that is acted upon by the external acceleration in the Z direction, (i.e. the acceleration applied to the accelerometer package which is to be measured) which causes rotation of the see-saw proof masses 410a, 410b about the rotation axes RAa, RAb. The combined centre of mass of both see-saw proof masses 410a, 410b is located at the centre of the accelerometer, along with the centre of mass of the in-plane structure 401, even when the see-saw proof mass rotate out of parallel with the substrate plane, since the change in position of the centre of mass of proof mass 410a caused by rotation of the proof mass is offset by an equal and opposite change in the position of the centre of mass 410b caused by its rotation.

The see-saw proof masses 410a, 410b are coupled together by springs 412a and 412b, which are located at the adjacent ends of the see-saw proof masses 410a, 410b. Springs 412a and 412b permit relative movement of the ends of the see-saw proof masses 410a and 410b away from each other parallel to the substrate plane, but resist relative movement of the ends of the see-saw proof masses 410a, 410b away from each other perpendicular to the substrate plane, i.e. in the Z direction. In this way, the see-saw proof masses 410a, 410b are generally free to rotate about rotation axes RAa and RAb in opposite directions, i.e. see-saw proof mass 410a rotates clockwise and see-saw proof mass 410b rotates anti-clockwise, or vice versa, since this causes relative motion of the ends of the see-saw proof masses 410a, 410b away or towards each other parallel to the substrate plane. However, rotation of the see-saw proof masses 410a, 410b in the same direction (i.e. both clockwise, or both anti-clockwise) is resisted by the springs 412a, 412b, since such rotation causes relative motion of the ends of the see-saw proof masses 410a, 410b perpendicular to the substrate plane. This coupling prevents the see-saw proof masses 410a, 410b from moving in response to external angular acceleration, in which case the see-saw proof masses 410a, 410b would rotate in the same direction, while still allowing the see-saw proof masses 410a, 410b to move in response to linear acceleration perpendicular to the substrate plane, which causes the see-saw proof masses 410a, 410b to rotate in opposite directions.

Movement of the see-saw proof masses 410a, 410b is measured capacitively. Rotation of the see-saw proof masses 410a, 410b is preferably measured by gap detection capacitors with parallel-plate electrodes located above or below the see-saw proof masses 410a, 410b, or can be measured by comb capacitors with moveable electrodes located on the see-saw proof masses 410a, 410b and stationary electrodes located on the two axis accelerometer proof mass 401.

Where gap-detection capacitors are used, electrodes 430a-d are formed on the see-saw proof masses 410a, 410b, and counterpart electrodes are formed on the substrate and/or cap wafer (not shown) above or below the see-saw proof masses 410a, 410b. The electrodes 430a and 430b are located at the ends of the C-shape of the see-saw proof mass 410a. Similarly, the electrodes 430c and 430d are located at the ends of the C-shape of the see-saw proof mass 410b. As the see-saw proof masses 410a, 410b rotate out of parallel with the substrate plane, the gaps between the electrodes 430a-d and the counterpart electrodes on the substrate and/or cap wafer increase or decrease depending on the extent of the rotation, thereby changing the measured capacitance of the gap-detection capacitors, which can in turn be used to derive the Z-axis acceleration of the device.

Optionally, the see-saw proof masses 410a and 410b may comprises further electrodes 431a-d. Electrode 431a is located on the same side of the C-shape of proof mass 410a as electrode 430a, on the opposite side of rotation axis RAa and torsion spring 411a to electrode 430a. Similarly, electrode 431b is located on the same side of the C-shape of proof mass 410a as electrode 430b, on the opposite side of rotation axis RAa and torsion spring 411b to electrode 430b.

Electrode 431c is located on the same side of the C-shape of proof mass 410b as electrode 430c, on the opposite side of rotation axis RAb and torsion spring 411c to electrode 430c. Similarly, electrode 431d is located on the same side of the C-shape of proof mass 410b as electrode 430d, on the opposite side of rotation axis RAb and torsion spring 411d to electrode 430d.

As with electrodes 430a-d, counterpart electrodes to electrodes 431a-d are formed on the substrate and/or cap wafer (not shown) above or below the see-saw proof masses 410a, 410b.

Since the see-saw proof masses 410a, 410b are connected to the proof mass of the two-axis accelerometer 401, the proof masses 410a, 410b are, like the proof mass 401, free to move parallel to the substrate plane relative to the substrate. In ideal conditions, when the capacitors formed from electrodes 430a-d and 431a-d are used to measure movement of the see-saw proof masses 410a, 410b out of parallel to the substrate plane (i.e. in the Z direction), movement of the see-saw proof masses parallel to the substrate plane 410a, 410b does not affect the out-of-plane capacitance measurement as long as the area of overlap between the electrodes 430a-d and 431a-d and the corresponding electrodes above/below the see-saw proof masses 410a, 410b does not change, i.e. if the electrodes 430a-d, 431a-d or plate electrodes above and/or below the see-saw proof masses 410a, 410b cover a large enough area.

In practice, alignment of the electrodes 430a-d, 431a-d and the corresponding electrodes above/below the see-saw proof masses 410a, 410b may not be perfectly parallel, e.g. due to imperfect alignment of the cap wafer during manufacturing or stress on the device during operation. Under such conditions, movement of the proof masses 410a, 410b parallel to the substrate plane may cause changes in the individual capacitances measured by each of the individual capacitors formed from electrodes 430a-430b and 181-184. However, taking a single and double differential measurements of the capacitance changes cancels out any such changes.

For example, if the counterpart electrodes are located on the cap wafer and the cap wafer is out of alignment so that the cap wafer electrodes on the left hand side are closer to the see-saw proof mass electrodes 431a, 431b than the cap wafer electrodes are to the see-saw proof mass electrode 431c, 431d, then movement of the see-saw proof masses in the X direction would result in a change of capacitance as the electrodes moved closer together or further apart due to the mis-alignment. Similarly, if the counterpart electrodes are located on the cap wafer and the cap wafer is out of alignment so that the cap wafer electrodes on the bottom side are closer to the see-saw proof mass electrodes 430b, 431b, 430d, 431d than the cap wafer electrodes are to the see-saw proof mass electrodes 430a, 431a, 430c, 431c, then movement of the see-saw proof masses in the Y direction would result in a change of capacitance as the electrodes moved closer together or further apart due to the mis-alignment. These effects would produce an unwanted signal indicating fictitious acceleration in the Z direction.

However, the capacitance can be measured according to the following formula:

$$(C431a-C430a)+(C431b-C430b)+(C431c-C430c)+(C431d-C430d)$$

Where C431a indicates the change in capacitance of the capacitor formed from the electrode 431a and its counterpart electrode above/below the see-saw proof mass 410a, etc. Within each single differential, e.g. C431a–C430a, any change in capacitance due to movement of the see-saw proof masses 410a, 410b in the Y direction is cancelled out, since the capacitance of the capacitor formed from electrode 171 is equally affected by the Y direction movement as the capacitor formed from electrode 172.

Movement of the see-saw proof masses 410a, 410b in the X direction causes equal difference in the change in capacitance between the capacitors formed by each of electrodes 430a and 431a and in the change in capacitance between the capacitors formed by each of electrodes 430c and 431c. However, each double differential, i.e. (C431a–C430a)+(C431c–C430c) can be re-written as (C431a–C430a)–(C430c–C431c), thus the error caused by movement in the X direction is also cancelled out.

Thus the arrangement of the electrodes 430a-d and 431a-d on either side of the rotation axes RAa and RAa, coupled with the opposite directions of rotation of each of the see-saw proof masses 410a, 410b allows for any unwanted change in capacitance of the capacitors used for Z axis sensing to be automatically and efficiently cancelled out.

Figure 5:
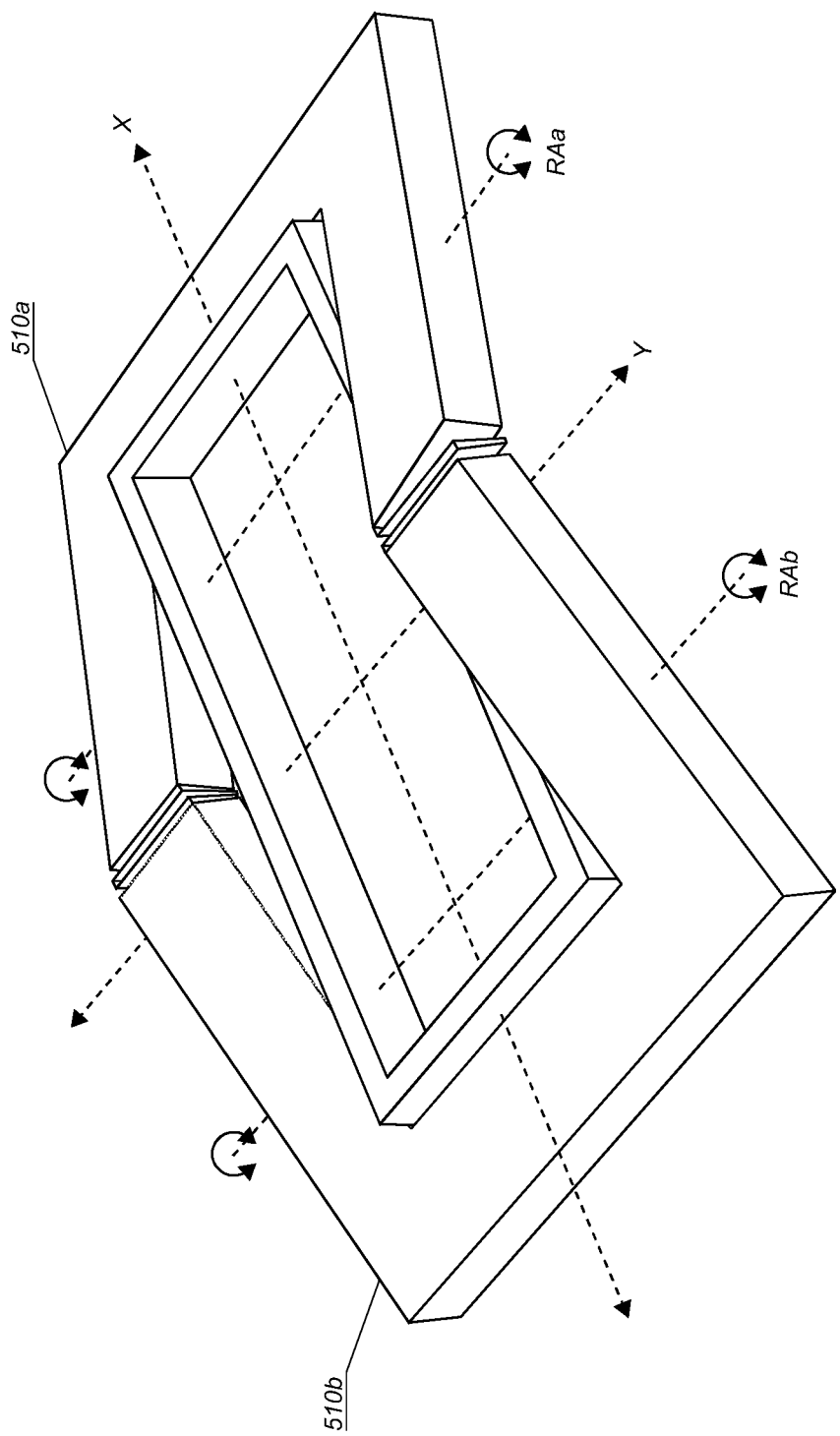
FIG. 5 shows a perspective view of the three-axis MEMS accelerometer of FIG. 4.

FIG. 5 shows a perspective view of the three-axis accelerometer depicted in FIG. 4, demonstrating the movement of the see-saw proof masses 510a, 510b along the rotation axes RAa, RAb, and the in-plane X and Y axes.

The following is a list of embodiments of the invention which may or may not be claimed later:

1. A MEMS accelerometer, the accelerometer comprising:
    a substrate, which defines a substrate plane;
    at least one in-plane proof mass that is configured to move relative to the substrate along at least a first axis and a second axis, wherein the first axis and second axis are parallel to the substrate plane and perpendicular to each other;
    a first measurement structure for measuring movement of the proof mass along a first measurement axis parallel to the first axis, the first measurement structure comprising a first moveable measurement structure, which is moveable relative to the substrate;
    characterised in that the at least one in-plane proof mass is connected to the first moveable measurement structure by at least one spring that mechanically couples the motion of the at least one in-plane proof mass and first moveable measurement structure along the first axis and mechanically decouples movement of the at least one in-plane proof mass and the first moveable measurement structure along the second axis.
2. The MEMS accelerometer of claim 1, wherein the first moveable measurement structure is connected to a first fixed support structure by at least one spring which mechanically couples the motion of the first moveable measurement structure and the first fixed support structure along the second axis and mechanically decouples movement of the first moveable measurement structure and the first fixed support structure along the first axis.
3. The MEMS accelerometer of any preceding embodiment, wherein the first measurement structure also comprises a first fixed measurement structure, which is fixed relative the substrate.
4. The MEMS accelerometer of embodiment 3, wherein the first moveable measurement structure comprises at least one first moveable electrode and the first fixed measurement structure comprises at least one first fixed electrode.
5. The MEMS accelerometer of embodiment 4, wherein the first measurement structure is configured to measure the change in capacitance between the at least one first fixed electrode and at least one first moveable electrode caused by movement of the at least one in-plane proof mass parallel to the first axis.
6. The MEMS accelerometer of embodiment 4 or 5, wherein the at least one first moveable electrode and at least one first fixed electrode are comb electrodes, and wherein the comb electrodes form a comb capacitor.
7. The MEMS accelerometer of any preceding embodiment, wherein the accelerometer further comprises:
    a second measurement structure for measuring movement of the proof mass along a second measurement axis parallel to the second axis, the second measurement structure comprising a second moveable measurement structure, which is moveable relative to the substrate;
    characterised in that the at least one in-plane proof mass is connected to the second moveable measurement structure by at least one spring that mechanically couples the motion of the at least one in-plane proof mass and second moveable measurement structure along the second axis and mechanically decouples movement of the at least one in-plane proof mass and the second moveable measurement structure along the first axis.
8. The MEMS accelerometer of embodiment 7, wherein the second measurement structure also comprises a second fixed measurement structure, which is fixed relative the substrate.
9. The MEMS accelerometer of embodiment 8, wherein the second moveable measurement structure comprises at least one second moveable electrode and the second fixed measurement structure comprises at least one second fixed electrode.
10. The MEMS accelerometer of embodiment 9, wherein the second measurement structure is configured to measure the change in capacitance between the second fixed comb electrode and second moveable comb electrode caused by movement of the at least one in-plane proof mass parallel to the second axis.
11. The MEMS accelerometer of embodiment 9 or 10, wherein the at least one second moveable electrode and at least one second fixed electrode are comb electrodes, and wherein the comb electrodes form a comb capacitor.
12. The MEMS accelerometer of any preceding embodiment, wherein the springs are beam springs, each of which resists compression along its longitudinal axis and permits bending of the spring along a transverse axis parallel to the substrate plane.
13. The MEMS accelerometer of embodiment 12, wherein each beam spring also resists bending of the spring along a transverse axis perpendicular to the substrate plane.
14. The MEMS accelerometer of any preceding embodiment, wherein the MEMS accelerometer further comprises one or more stoppers, which may be fixed to the substrate or a cap wafer, and which restrict movement of the moveable measurement structures in at least one direction perpendicular to the measurement axis of the measurement structure.
15. The MEMS accelerometer of any one of embodiments 3 to 14, wherein the MEMS accelerometer further comprises a third measurement structure, for measuring movement of the proof mass along the first measurement axis parallel to the first axis, the third measurement structure comprising a third moveable measurement structure, which is moveable relative to the substrate, and a third fixed measurement structure, which is fixed relative to the substrate, wherein the third measurement structure is positioned on the opposite side of the MEMS accelerometer to the first measurement structure, and wherein the arrangement of the third moveable measurement structure and third fixed measurement structure is a reflection of the arrangement of the first moveable measurement structure and first fixed measurement structure about a central axis of reflection parallel to the second axis and located between the moveable and fixed measurement structures.
16. The MEMS accelerometer of embodiment 0, wherein the first moveable measurement structure and third moveable measurement structure are connected by a central beam to form a unitary moveable measurement structure.
17. The MEMS accelerometer of embodiment 16, wherein each of the first and third moveable measurement structures is a longitudinal beam, and wherein the central beam is a transverse beam extending from the centre of each longitudinal beam, wherein the longitudinal beams are arranged parallel to the first axis and the transverse beam is arrange parallel to the second axis.
18. The MEMS accelerometer of embodiment 17, wherein the first fixed measurement structure comprises two first fixed measurement structures and wherein the third fixed measurement structure comprises two third fixed measurement structures, wherein the first fixed measurement structures and third fixed measurement structures are located between the longitudinal beams and such that one of the first fixed measurement structures and one of the first third fixed measurement structures are located on each side of the central beam.
19. The MEMS accelerometer of embodiment 17 or 18, wherein the unitary moveable measurement structure is connected to the at least one in-plane proof mass by four springs, wherein each of the four springs is located at one of the ends of the longitudinal beams.
20. The MEMS accelerometer of any one of embodiments 17 to 19, wherein the unitary moveable measurement structure is connected to the fixed support structures by four springs, wherein each of the four springs is located at one of the ends of the longitudinal beams.
21. The MEMS accelerometer of embodiment 0, wherein each of the first and third moveable measurement structures is a longitudinal beam, and wherein the first fixed measurement structure and third fixed measurement structure are located between the first moveable measurement structure and the third moveable measurement structure.
22. The MEMS accelerometer of embodiment 21, wherein the first moveable measurement structure is connected to the at least one in-plane proof mass by two springs, wherein each of the two springs is connected to the first moveable measurement structure at the centre of the first moveable measurement structure, or within the middle 25% of the first moveable measurement structure, and wherein the third moveable measurement structure is connected to the at least one in-plane proof mass by two springs, wherein each of the two springs is connected to the third moveable measurement structure at the centre of the third moveable measurement structure, or within the middle 25% of the third moveable measurement structure.
23. The MEMS accelerometer of any one of embodiments 20 to 22, wherein the first moveable measurement structure is connected to the first fixed support structure by two springs, wherein each of the two springs is located at one of the ends of the first moveable measurement structure, and wherein the third moveable measurement structure is connected to the third fixed support structure by two springs, wherein each of the two springs is located at one of the ends of the third moveable measurement structure.
24. The MEMS accelerometer of embodiment 23, wherein the first and third fixed support structures are connected to a common anchor point at the centre of the accelerometer.
25. The MEMS accelerometer of embodiment 24, wherein the first and third fixed measurement structures are connected to the common anchor point at the centre of the accelerometer.
26. The MEMS accelerometer of any one of embodiments 7 to 25, wherein the MEMS accelerometer further comprises a fourth measurement structure, for measuring movement of the proof mass along the second measurement axis parallel to the second axis, the fourth measurement structure comprising a fourth moveable measurement structure, which is moveable relative to the substrate, and a fourth fixed measurement structure, which is fixed relative to the substrate, wherein the fourth measurement structure is positioned on the opposite side of the MEMS accelerometer to the second measurement structure, and wherein the arrangement of the fourth moveable measurement structure and fourth fixed measurement structure is a reflection of the arrangement of the second moveable measurement structure and second fixed measurement structure about a central axis of reflection parallel to the first axis and located between the moveable and fixed measurement structures.

27. The MEMS accelerometer embodiment 26, wherein each of the second and fourth moveable measurement structures is a longitudinal beam, and wherein the second fixed measurement structure and fourth fixed measurement structure are located between the second moveable measurement structure and the fourth moveable measurement structure.

28. The MEMS accelerometer of embodiment 27, wherein the second moveable measurement structure is connected to the at least one in-plane proof mass by two springs, wherein each of the two springs is connected to the first moveable measurement structure at the centre of the first moveable measurement structure, or within the middle 25% of the first moveable measurement structure, and wherein the fourth moveable measurement structure is connected to the at least one in-plane proof mass by two springs, wherein each of the two springs is connected to the third moveable measurement structure at the centre of the third moveable measurement structure, or within the middle 25% of the third moveable measurement structure.

29. The MEMS accelerometer of any one of embodiments 26 to 28, wherein the second moveable measurement structure is connected to the first fixed support structure by two springs, wherein each of the two springs is located at one of the ends of the second moveable measurement structure, and wherein the fourth moveable measurement structure is connected to the third fixed support structure by two springs, wherein each of the two springs is located at one of the ends of the fourth moveable measurement structure.

30. The MEMS accelerometer of any one of embodiments 26 to 29, wherein the second and fourth measurement structures are located on opposite sides of the accelerometer, and wherein the first and third measurement structure are located between the second and fourth measurement structures.

31. The MEMS accelerometer of any preceding embodiment, wherein the at least one in-plane proof mass has a generally rectangular outer perimeter and a hollow centre, and wherein the measurement structures, fixed support structures and springs are located within the hollow centre of the at least one in-plane proof mass.

32. The MEMS accelerometer of any preceding embodiment, further comprising at least two out-of-plane proof masses, wherein the out-of-plane proof masses are configured to rotate out of parallel to the substrate plane, wherein the combined centre of mass of the at least two proof masses is at the centre of the accelerometer.

33. The MEMS accelerometer of embodiment 32, further comprising out-of-plane sense circuitry configured to sense rotation of the at least two out-of-plane proof masses out of parallel to the substrate plane.

34. The MEMS accelerometer of embodiment 33, wherein the out-of-plane sense circuitry comprises one or more moveable electrodes located on each out-of-plane proof mass and stationary electrodes that are in a fixed position relative to the substrate, wherein the moveable electrode and the stationary electrode form a capacitor, the capacitance of which changes as the out-of-plane proof mass rotates about its rotation axis.

35. The MEMS accelerometer of any one of embodiments 32 to 34, wherein the centre of mass of each out-of-plane proof mass is offset from its axis of rotation such that:
external acceleration in the out-of-plane axis acts upon the asymmetric mass of each proof mass to cause rotation of the proof mass about the axis of rotation; and
external acceleration in a first axis parallel to the substrate plane acts upon the asymmetric mass and symmetric mass of both proof masses to cause movement of the proof masses parallel to the substrate plane.

36. The MEMS accelerometer of any one of embodiments 31 to 35, wherein the at least two out-of-plane proof masses are rotatably connected to the at least one in-plane proof mass such that movement of the at least two out-of-plane proof masses parallel to the substrate plane causes movement of the at least one in-plane proof mass parallel to the substrate plane.

37. The MEMS accelerometer embodiment 36, wherein the at least two out-of-plane proof masses are connected to the at least one in-plane proof mass via torsion springs, wherein the torsion springs allow rotation of the at least two out-of-plane proof masses out of parallel to the substrate plane and resist movement of the at least two proof masses parallel to the substrate plane relative to the at least one in-plane proof mass.

38. The MEMS accelerometer of any one of embodiments 32 to 37, wherein the at least two out-of-plane proof masses are located towards the exterior of the MEMS accelerometer relative to the at least one in-plane proof mass.

39. The MEMS accelerometer of embodiment 38, wherein the out-of-plane plane proof masses comprise two C-shaped seesaw proof masses which extend around the exterior of the at least one in-plane mass, such that the two C-shaped out-of-plane proof masses are arranged as mirror-images and the proof masses is configured to rotate in opposite directions in response to an external acceleration in the out-of-plane axis.

40. The MEMS accelerometer of embodiment 39, wherein the two C-shaped out-of-plane proof masses are coupled by at least two springs, wherein at least one spring is disposed at each end of the C shape, such that the springs allow rotation of the two C-shaped out-of-plane proof masses in opposite directions but resist rotation of the two C-shaped out-of-plane proof masses in the same direction.

41. The MEMS accelerometer of any one of embodiments 33 to 40, wherein the second sense circuitry comprises eight electrodes disposed on the see-saw proof masses and eight electrodes disposed above or below the see-saw proof masses forming eight gap detection capacitors, each capacitor being formed from one of the see-saw proof mass electrodes and one of the electrodes disposed above or below the see-saw proof masses, wherein:
four electrodes are located on each proof mass;
on each proof mass, a first pair of electrodes is located at a first end of the C-shape of the see-saw proof mass and a second pair of electrodes is located at a second end of the C-shape of the see-saw proof mass; and within each pair of electrodes, a first electrode is located towards the middle of the C-shape of the see-saw proof mass from the rotation axis of the see-saw proof mass and a second electrode is located towards the end of the C-shape of the see-saw proof mass from the rotation axis of the see-saw proof mass.

42. The MEMS accelerometer of embodiment 41, wherein acceleration of the accelerometer in the Z direction is measured from the changes in capacitance of the gap detection capacitors using a double differential measurement.

43. The MEMS accelerometer of any one of embodiments 1 to 14, wherein the first moveable measurement structure comprises two comb electrodes, wherein each comb electrode extends in opposite directions away from the first moveable measurement structure and such that the fingers of the comb electrodes extend parallel to the second axis.

44. The MEMS accelerometer of embodiment 4347, wherein the first moveable measurement structure comprises a transverse beam, which extends parallel to the second axis, and two longitudinal beams, which are joined to and extend away from the transverse beam parallel to the first axis, such that there is a gap between the two longitudinal beams which extends along the first axis.

45. The MEMS accelerometer of embodiment 44, wherein the spring connecting the at least one in-plane proof mass to the first moveable measurement structure is connected to the transverse beam of the moveable measurement structure and is located within the gap between the longitudinal beams.

46. The MEMS accelerometer of embodiment 45, wherein one of the comb electrodes is connected to and extends away from each longitudinal beam.

47. The MEMS accelerometer of any one of embodiments 43 to 46, further comprising two first fixed measurement structures, wherein the fixed measurement structures comprise beams whose longitudinal axes extend away from the centre of the accelerometer perpendicular to one another and parallel to the substrate plane.

48. The MEMS accelerometer of embodiment 47, wherein each first fixed measurement structure extends away from the centre of the accelerometer at a 45-degree angle to the first axis.

49. The MEMS accelerometer of embodiment 48, wherein the first moveable measurement structure is at least partially located between the first fixed measurement structures.

50. The MEMS accelerometer of embodiment 49, wherein the fixed measurement structures further comprises comb electrodes extending from the fixed measurement structures towards the first moveable measurement structure to form two comb capacitors.

51. The MEMS accelerometer of any one of embodiments 7 to 14, wherein the second moveable measurement structure comprises two comb electrodes, wherein each comb electrode extends in opposite directions away from the second moveable measurement structure, and such that the fingers of the comb electrodes extend parallel to the first axis.

52. The MEMS accelerometer of embodiment 5147, wherein the second moveable measurement structure comprises a transverse beam, which extends parallel to the first axis, and two longitudinal beams, which are joined to an extend away from the transverse beam parallel to the second axis, such that there is a gap between the two longitudinal beams which extends along the second axis.

53. The MEMS accelerometer of embodiment 52, wherein the spring connecting the at least one in-plane proof mass to the second moveable measurement structure is connected to the transverse beam of the moveable measurement structure and is located within the gap between the longitudinal beams.

54. The MEMS accelerometer of embodiment 53, wherein one of the comb electrodes is connected to and extends away from each longitudinal beam.

55. The MEMS accelerometer of any one of embodiments 51 to 54, further comprising two second fixed measurement structures, wherein the second fixed measurement structures comprise beams whose longitudinal axes extend away from the centre of the accelerometer perpendicular to one another and parallel to the substrate plane.

56. The MEMS accelerometer of embodiment 55, wherein each second fixed measurement structure extends away from the centre of the accelerometer at a 45-degree angle to the second axis.

57. The MEMS accelerometer of embodiment 56, wherein the second moveable measurement structure is at least partially located between the second fixed measurement structures.

58. The MEMS accelerometer of embodiment 57, wherein the second fixed measurement structures further comprises comb electrodes extending from the second fixed measurement structures towards the first moveable measurement structure to form two comb capacitors.

59. The MEMS accelerometer of any one of embodiments 43 to 58, wherein the MEMS accelerometer further comprises a third measurement structure, for measuring movement of the proof mass along the first measurement axis parallel to the first axis, the third measurement structure comprising a third moveable measurement structure, which is moveable relative to the substrate, and two third fixed measurement structures, which are fixed relative to the substrate, wherein the third measurement structure is positioned on the opposite side of the MEMS accelerometer to the first measurement structure, and wherein the arrangement of the third moveable measurement structure and third fixed measurement structures is a reflection of the arrangement of the first moveable measurement structure and first fixed measurement structure about a central axis of the MEMS accelerometer.

60. The MEMS accelerometer of any one of embodiments 51 to 59, wherein the MEMS accelerometer further comprises a fourth measurement structure, for measuring movement of the proof mass along the second measurement axis parallel to the second axis, the fourth measurement structure comprising a fourth moveable measurement structure, which is moveable relative to the substrate, and two fourth fixed measurement structures, which are fixed relative to the substrate, wherein the fourth measurement structure is positioned on the opposite side of the MEMS accelerometer to the second measurement structure, and wherein the arrangement of the fourth moveable measurement structure and fourth fixed measurement structures is a reflection of the arrangement of the second moveable measurement structure and second fixed measurement structure about a central axis of the MEMS accelerometer.

61. The MEMS accelerometer of embodiment 60, wherein the transverse beams of the first, second, third and fourth moveable measurement structures are arranged such that the outer edges of the transverse beams form part of the perimeter of a square.

62. The MEMS accelerometer of any one of embodiments 43 to 61, wherein the at least one in-plane proof mass is located at the centre of the accelerometer when the accelerometer is at rest.

63. The MEMS accelerometer of any one of embodiments 43 to 62, wherein the first moveable measurement structure is connected by at least one spring to a first fixed support structure and by at least one spring to a second fixed support structure.

64. The MEMS accelerometer of embodiment 63, wherein the second moveable measurement structure is connected by at least one spring to the first fixed support structure and by at least one spring to a third fixed support structure.

65. The MEMS accelerometer of embodiment 64, wherein the third moveable measurement structure is connected by at least one spring to the third fixed support structure and by at least one spring to a fourth fixed support structure.

66. The MEMS accelerometer of embodiment 65, wherein the fourth moveable measurement structure is connected by at least one spring to the fourth fixed support structure and by at least one spring to the second fixed support structure.

67. The MEMS accelerometer of embodiment 66, wherein the first, second, third and fourth fixed support structures are anchored to the substrate at first, second, third and fourth anchor points respectively, and wherein the fixed support structures extend away from the anchor points towards the exterior of the accelerometer at 45-degree angle to the first axis and at a 45-degree angle to the second axis.

68. The MEMS accelerometer of embodiment 67, wherein:
the first fixed support structure is located between one of the first fixed measurement structures and one of the second fixed measurement structures and extends parallel to the adjacent first and second fixed measurement structures;
the second fixed support structure is located between one of the first fixed measurement structures and one of the fourth fixed measurement structures and extends parallel to the adjacent first and fourth fixed measurement structures;
the third fixed support structure is located between one of the second fixed measurement structures and one of the third fixed measurement structures and extends parallel to the adjacent second and third fixed measurement structures; and
the fourth fixed support structure is located between one of the third fixed measurement structures and one of the fourth fixed measurement structures and extends parallel to the adjacent third and fourth fixed measurement structures.

69. The MEMS accelerometer of any one of embodiments 63 to 68, wherein a first spring extends from each fixed support structure along a longitudinal axis of the fixed support structure to a corner of the accelerometer, where is it connected second and third springs which extend away from the first spring at 45-degree angles to the first spring and 90-degree angle to each other, and wherein the second and third springs are connected to the adjacent moveable measurement structures.

The invention claimed is:

1. A MEMS accelerometer, the accelerometer comprising:
a substrate, which defines a substrate plane;
at least one in-plane proof mass that is configured to move relative to the substrate along a first axis when the accelerometer undergoes external acceleration in a direction of the first axis and along a second axis when the accelerometer undergoes external acceleration in a direction of the second axis, wherein the first axis and second axis are parallel to the substrate plane and perpendicular to each other;
a first measurement structure for measuring external acceleration upon the in-plane proof mass along a first measurement axis parallel to the first axis by measuring movement of the in-plane proof mass along the first axis, the first measurement structure comprising a first moveable measurement structure, which is moveable relative to the substrate and first fixed measurement structures, which are fixed relative to the substrate, the first moveable measurement structure and the first fixed measurement structures forming two sense comb capacitors which are reflected about the first measurement axis;
a second measurement structure for measuring external acceleration upon the in-plane proof mass along a second measurement axis parallel to the second axis by measuring movement of the in-plane proof mass along the second axis, the second measurement structure comprising a second moveable measurement structure, which is moveable relative to the substrate and a second fixed measurement structure, which is fixed relative to the substrate, the second moveable measurement structure and the second fixed measurement structure forming a sense comb capacitor;
a third measurement structure for measuring external acceleration upon the in-plane proof mass along the second measurement axis parallel to the second axis by measuring movement of the in-plane proof mass along the second axis, the third measurement structure comprising a third moveable measurement structure, which is moveable relative to the substrate and a third fixed measurement structure, which is fixed relative to the substrate, the third moveable measurement structure and the third fixed measurement structure forming a sense comb capacitor;
wherein the sense comb capacitor of the second measurement structure and the sense comb capacitor of the third measurement structure are reflected about the second measurement axis;
wherein the in-plane proof mass extends around the exterior of the first measurement structure, the second measurement structure and the third measurement structure;
wherein the in-plane proof mass is connected to the first moveable measurement structure by at least one spring that mechanically couples the motion of the in-plane proof mass and the first moveable measurement structure along the first axis and mechanically decouples movement of the in-plane proof mass and the first moveable measurement structure along the second axis;
wherein the in-plane proof mass that extends around the exterior of the second measurement structure is connected to the second movable measurement structure by at least one spring that mechanically couples the motion of the in-plane proof mass and the second moveable measurement structure along the second axis and mechanically decouples movement of the in-plane proof mass and the second moveable measurement structure along the first axis;

wherein the in-plane proof mass that extends around the exterior of the third measurement structure is connected to the third moveable measurement structure by at least one spring that mechanically couples the motion of the in-plane proof mass and the third moveable measurement structure along the second axis and mechanically decouples movement of the in-plane proof mass and the third moveable measurement structure along the first axis;

wherein the first moveable measurement structure is an H-shaped structure formed of two longitudinal beams connected by a central transverse beam that extends from the centre of each longitudinal beam, wherein the longitudinal beams are arranged parallel to the first axis and the central transverse beam is arranged parallel to the second axis; and wherein the central transverse beam of the first moveable measurement structure extends between the second and third measurement structures such that the second and third measurement structures are located on opposite sides of the central transverse beam of the first moveable measurement structure.

2. The MEMS accelerometer of claim 1, wherein the first moveable measurement structure is connected to at least one first fixed support structure by at least one spring which mechanically couples the motion of the first moveable measurement structure and the at least one first fixed support structure along the second axis and mechanically decouples movement of the first moveable measurement structure and the at least one first fixed support structure along the first axis.

3. The MEMS accelerometer of claim 1, wherein the first moveable measurement structure comprises first moveable electrodes and the first fixed measurement structures comprise first fixed electrodes, and wherein the first measurement structure is configured to measure the change in capacitance between the first fixed electrodes and first moveable electrodes caused by movement of the in-plane proof mass parallel to the first axis.

4. The MEMS accelerometer of claim 1, wherein the first fixed measurement structures are located between the longitudinal beams of the first moveable measurement structure.

5. The MEMS accelerometer of claim 4, wherein the first fixed measurement structures are located such that at least one of the first fixed measurement structures is located on each side of the central beam.

6. The MEMS accelerometer of claim 4, wherein the first moveable measurement structure is connected to the in-plane proof mass by four springs, wherein each of the four springs is located at one of the ends of the longitudinal beams.

7. The MEMS accelerometer of claim 2, wherein the first moveable measurement structure is connected to the at least one fixed support structure by four springs, wherein each of the four springs is located at one of the ends of the longitudinal beams.

8. The MEMS accelerometer of claim 1, wherein the second moveable measurement structure comprises at least one second moveable electrode and the second fixed measurement structure comprises at least one second fixed electrode such that the capacitance of the capacitor formed by the second fixed comb electrode and second moveable comb electrode changes with movement of the in-plane proof mass parallel to the second axis; and wherein the third moveable measurement structure comprises at least one third moveable electrode and the third fixed measurement structure comprises at least one third fixed electrode such that capacitance of the capacitor formed by the third moveable electrode and third fixed electrode changes with movement of the in-plane proof mass parallel to the second axis.

9. The MEMS accelerometer of claim 1, wherein the at least one spring comprises a plurality of beam springs, each of which resists compression along its longitudinal axis and permits bending of the spring along a transverse axis parallel to the substrate plane.

10. The MEMS accelerometer of claim 8, wherein each beam spring also resists bending of the spring along a transverse axis perpendicular to the substrate plane.

11. The MEMS accelerometer of claim 1, wherein the MEMS accelerometer further comprises one or more stoppers, each fixed to the substrate or a cap wafer, and which restrict movement of a corresponding moveable measurement structure of the first measurement structure, the second measurement structure or the third measurement structure in at least one direction perpendicular to the measurement axis of the corresponding measurement structure.

* * * * *